US012180665B2

(12) United States Patent
French, Sr.

(10) Patent No.: US 12,180,665 B2
(45) Date of Patent: Dec. 31, 2024

(54) MODULAR PRECAST PUMPED STORAGE HYDRO SYSTEM FOR POWER GENERATION

(71) Applicant: W.L. French Hydropower Holdings LLC, Chelmsford, MA (US)

(72) Inventor: William L. French, Sr., Lexington, MA (US)

(73) Assignee: W.L. FRENCH HYDROPOWER HOLDINGS LLC, Chelmsford, MA (US)

( * ) Notice: Subject to any disclaimer, the term of this patent is extended or adjusted under 35 U.S.C. 154(b) by 0 days.

(21) Appl. No.: 17/951,692

(22) Filed: Sep. 23, 2022

(65) Prior Publication Data

US 2024/0218623 A1 Jul. 4, 2024

Related U.S. Application Data

(63) Continuation-in-part of application No. 17/662,383, filed on May 6, 2022, now abandoned, which is a (Continued)

(51) Int. Cl.
*E02B 9/02* (2006.01)
*F03B 15/14* (2006.01)

(52) U.S. Cl.
CPC ................ *E02B 9/02* (2013.01); *F03B 15/14* (2013.01)

(58) Field of Classification Search
CPC ..... E02B 9/00; E02B 9/02; E02B 9/04; E02B 9/08; Y02E 10/20; F03B 15/14
See application file for complete search history.

(56) References Cited

U.S. PATENT DOCUMENTS 198,939 A 1/1878 Herron
838,587 A 12/1906 Von Schon
(Continued)

FOREIGN PATENT DOCUMENTS

BR 112015022633-7 11/2021
DE 3029087 A1 2/1981
(Continued)

OTHER PUBLICATIONS

Chaudhari et al.; "A Study of Dynamic Response of Circular Water Tank with Baffle Walls"; Aug. 2017; International Research Journal of Engineering and Technology; All (Year: 2017).*
(Continued)

*Primary Examiner* — Benjamin F Fiorello
(74) *Attorney, Agent, or Firm* — Hamilton, Brook, Smith & Reynolds, P.C.

(57) ABSTRACT

Hydroelectric power generation systems and methods of using such systems are provided. A power generation system includes a reservoir that is at least partially defined by a plurality of precast segments. At least a subset of the precast segments are interconnected via complementary coupling elements. The reservoir is elevated with respect to a fluid supply. The system further includes a flow path providing fluid communication between the reservoir and the fluid supply, a power generation module configured to pump fluid from the fluid supply and into the reservoir via the flow path, and a power conversion module configured to convert kinetic energy of fluid released from the reservoir and travelling through the flow path into electric energy.

36 Claims, 16 Drawing Sheets

Related U.S. Application Data continuation of application No. 17/456,125, filed on Nov. 22, 2021, now abandoned, which is a continuation of application No. 17/301,846, filed on Apr. 15, 2021, now abandoned, which is a continuation of application No. 17/063,539, filed on Oct. 5, 2020, now abandoned, which is a continuation of application No. 16/790,694, filed on Feb. 13, 2020, now abandoned.

(60) Provisional application No. 62/805,804, filed on Feb. 14, 2019.

(56) References Cited

U.S. PATENT DOCUMENTS 840,110 A 1/1907 Coburn
853,146 A * 5/1907 Gerstenbergk-Zeck ..................... E02B 9/00 405/104
870,866 A 11/1907 Church
946,585 A 1/1910 Smith
1,314,743 A * 9/1919 Groat ........................ E02B 3/06 405/25
1,594,578 A 8/1926 Thurlow
1,628,933 A 5/1927 Troiel
1,898,095 A 2/1933 Noetzli
2,138,070 A 11/1938 Harrison et al.
2,138,071 A 11/1938 Harrison et al.
2,515,059 A 7/1950 William
2,566,748 A 9/1951 Hall
2,961,731 A 11/1960 Buzzell et al.
2,962,599 A * 11/1960 Pirkey ..................... F03B 13/06 290/43
3,342,033 A 9/1967 Crouch et al.
3,629,985 A * 12/1971 Ueno ..................... B65D 88/76 52/509
4,023,590 A * 5/1977 Harris ..................... E02D 29/12 52/21
4,031,676 A 6/1977 Dally
4,109,160 A * 8/1978 Goto ....................... F03B 13/06 415/17
4,132,901 A * 1/1979 Crausbay .................. E02B 9/00 417/330
4,182,123 A 1/1980 Ueda
4,260,286 A 4/1981 Buchanan
4,290,246 A 9/1981 Hilsey
4,307,299 A * 12/1981 Norton .................... F03B 13/00 60/398
4,319,142 A 3/1982 Mayo, Jr.
4,437,017 A 3/1984 Osterberg
4,468,153 A 8/1984 Gutierrez Atencio
4,493,587 A 1/1985 Ferrari
4,569,200 A 2/1986 Lamb
4,573,827 A 3/1986 Mayo, Jr.
4,740,105 A 4/1988 Wollander
4,772,157 A 9/1988 Obermeyer
4,941,771 A * 7/1990 Perper ....................... E02B 9/00 405/75
4,998,846 A 3/1991 Evstratov
5,161,913 A 11/1992 Boylan
5,195,846 A 3/1993 Lemperiere
5,439,316 A 8/1995 Richardson
5,817,944 A 10/1998 Chung
6,012,872 A 1/2000 Perry et al.
6,042,301 A 3/2000 Sovran
6,155,746 A 12/2000 Peter
6,243,994 B1 * 6/2001 Bernini ................. E02D 29/045 405/126
6,273,639 B1 8/2001 Eikrem
6,281,597 B1 8/2001 Obermeyer et al.
6,672,799 B2 1/2004 Earl
6,712,555 B1 3/2004 Truebe et al.
6,942,423 B2 9/2005 Davis
7,029,200 B1 4/2006 Cravens
7,153,060 B1 * 12/2006 Bennion ................... E02B 9/00 405/80
7,214,005 B1 5/2007 Davis
7,422,392 B2 9/2008 Obermeyer
7,478,974 B1 1/2009 Kelly
7,651,298 B2 1/2010 Boudreaux, Jr.
7,708,495 B1 5/2010 Antee
8,034,238 B2 * 10/2011 Ghalib .................... C02F 1/006 210/170.03
8,066,449 B2 11/2011 Lux, III
8,128,318 B1 * 3/2012 Anderson, Jr. ....... F03B 13/264 60/498
8,414,223 B2 4/2013 French
8,596,909 B2 * 12/2013 Wilhelms ................ E03F 1/002 405/36
8,845,231 B2 9/2014 Holstein
9,034,454 B1 5/2015 Bowman
9,103,084 B2 * 8/2015 French, Sr. ............... E02B 8/06
9,730,431 B2 8/2017 French
9,797,107 B1 * 10/2017 Huang ...................... E02B 9/06
10,760,233 B2 9/2020 French, Sr.
11,313,116 B2 * 4/2022 Eggleston, II .......... E03F 5/101
11,708,674 B2 7/2023 French, Sr.
2002/0018696 A1 2/2002 Robinson
2002/0031401 A1 3/2002 Yang
2002/0139736 A1 * 10/2002 Stever ................ B01D 17/0211 210/170.03
2004/0009040 A1 1/2004 Boylan
2004/0234218 A1 11/2004 Tac
2004/0265060 A1 12/2004 Lee et al.
2005/0034452 A1 * 2/2005 Davis ...................... F03B 3/103 60/398
2005/0074289 A1 4/2005 Tucker
2005/0207844 A1 9/2005 Boccotti
2006/0007388 A1 4/2006 Obermeyer
2007/0116522 A1 5/2007 Boudreaux, Jr.
2007/0154265 A1 7/2007 Stauffacher et al.
2008/0075535 A1 3/2008 Han
2008/0089743 A1 4/2008 Han
2008/0175667 A1 7/2008 Liou
2008/0213045 A1 9/2008 Tappel
2008/0240861 A1 10/2008 Phillips
2008/0253837 A1 * 10/2008 Miller ..................... F03B 13/06 405/80
2009/0041543 A1 2/2009 Kroger
2009/0293469 A1 * 12/2009 Chen ..................... F03B 13/266 405/75
2009/0322091 A1 12/2009 Jack
2010/0045311 A1 2/2010 Chung
2010/0074687 A1 3/2010 Boudreaux, Jr.
2010/0129156 A1 5/2010 Taylor
2010/0139185 A1 * 6/2010 Neighbors ................ E04H 7/06 52/745.01
2010/0260548 A1 10/2010 Shipley et al.
2010/0270811 A1 10/2010 Angulo Valpreda et al.
2011/0146802 A1 6/2011 Feher
2011/0225965 A1 9/2011 Van Niekerk
2012/0009018 A1 1/2012 Marquis
2012/0019004 A1 * 1/2012 Ekern ....................... E02B 9/08 290/53
2012/0087733 A1 4/2012 French, Sr.
2012/0237298 A1 9/2012 Cook
2013/0236249 A1 9/2013 Greif
2013/0266378 A1 10/2013 French, Sr.
2014/0183122 A1 7/2014 Canals
2014/0270965 A1 * 9/2014 Igel, V .................... F03B 13/06 405/53
2014/0348662 A1 * 11/2014 Schibsbye ............... E04H 12/12 264/308
2014/0356070 A1 12/2014 Stromotich
2015/0056085 A1 * 2/2015 Fiske ........................ E02B 9/00 417/313
2015/0247300 A1 9/2015 Seo
2015/0300036 A1 * 10/2015 Khoshnevis ........ E04G 21/0463 425/63
2016/0017558 A1 * 1/2016 French, Sr. .......... G01N 27/028 405/81

(56) References Cited

U.S. PATENT DOCUMENTS

| | | | |
|---|---|---|---|
| 2016/0273512 | A1 | 9/2016 | Nanehkaran |
| 2016/0286766 | A1 | 10/2016 | French |
| 2017/0016244 | A1* | 1/2017 | Keller ................. E04G 21/0436 |
| 2017/0321397 | A1* | 11/2017 | Kent ....................... E03B 11/14 |
| 2017/0370063 | A1 | 12/2017 | French |
| 2018/0178977 | A1* | 6/2018 | Crowther .................. E04B 1/20 |
| 2018/0298874 | A1* | 10/2018 | Turk ....................... F03B 15/14 |
| 2019/0186458 | A1* | 6/2019 | Obermeyer ............... E02B 9/06 |
| 2019/0256172 | A1* | 8/2019 | Hadjerioua ............. B63B 35/00 |
| 2019/0277000 | A1 | 9/2019 | French, Sr. |
| 2020/0011048 | A1* | 1/2020 | Kent ....................... E03B 11/14 |
| 2022/0154416 | A1 | 5/2022 | French, Sr. |

FOREIGN PATENT DOCUMENTS

| | | | |
|---|---|---|---|
| DE | 3718805 | A1 | 12/1988 |
| DE | 199 59 116 | A1 | 6/2001 |
| EP | 399870 | A1 | 11/1990 |
| FR | 2289680 | A1 | 5/1976 |
| FR | 2692298 | A1 | 12/1993 |
| GB | 2055933 | A | 3/1981 |
| JP | 2005-090208 | | 4/2005 |
| KR | 200381909 | Y1 | 4/2005 |
| KR | 10-2006-0025314 | | 3/2006 |
| KR | 100641826 | B1 | 11/2006 |
| KR | 10-2008-0077937 | | 8/2008 |
| KR | 10-2009-0047190 | | 5/2009 |
| KR | 100994578 | B1 | 11/2010 |
| KR | 101008839 | B1 | 1/2011 |
| WO | WO 2011/133913 | A2 | 10/2011 |
| WO | WO 2013/89958 | A1 | 6/2013 |
| WO | 2017066655 | A1 | 4/2017 |

OTHER PUBLICATIONS

U.S. Department of Energy. (n.d.), "Pumped Storage Hydropower", Accessed Dec. 22, 2022. https://www.energy.gov/eere/water/pumped-storage-hydropower.

Precast Segmental Lining for Underground Tunnels; https://www.nbmcw.com/product-technology/precast/precast-segmental-lining-for-underground-tunnels.html; Oct. 2019; 16 pages.

Delivering Concrete Segments to the Metro Tunnel—Waking up in Geelong; https://wongm.com/2019/12/melbourne-metro-tunnel-concrete-segments/; Dec. 10, 2019; 11 pages.

* cited by examiner

MODULAR PRECAST PUMPED STORAGE HYDRO SYSTEM FOR POWER GENERATION

RELATED APPLICATION(S)

This application is a Continuation-in-Part of U.S. application Ser. No. 17/662,383, filed May 6, 2022 which is a continuation of U.S. application Ser. No. 17/456,125, filed Nov. 22, 2021, which is a continuation of U.S. application Ser. No. 17/301,846, now abandoned, filed Apr. 15, 2021, which is a continuation of U.S. application Ser. No. 17/063,539, now abandoned, filed Oct. 5, 2020, which is a continuation of U.S. application Ser. No. 16/790,694, now abandoned, filed Feb. 13, 2020, which claims the benefit of U.S. Provisional Application No. 62/805,804, filed on Feb. 14, 2019. The entire teachings of the above applications are incorporated herein by reference.

BACKGROUND

Hydroelectric dams provide electrical power by converting kinetic energy provided by running water into electrical power through use of rotation-to-electric converters, as well known in the art. An example of such a dam is the Hoover Dam that provides great amounts of electrical power for providing electricity to a grid that is configured to distribute electrical energy to a local area. As well understood in the art, to install a dam requires discontinuity of the flow of water over the portion of land at which the dam is to be placed such that pouring of concrete and curing of the concrete may be done, with installation of power generation components to be completed prior to redirecting the water flow back to the location of the dam.

Pumped storage hydropower systems also provide electrical power based on conversion of kinetic energy provided by running water. Pumped storage hydropower systems typically include two water reservoirs, where one water reservoir is located at a higher elevation than the other. Power is generated as water moves from the upper reservoir to the lower reservoir via a turbine or other power generation components. The system is "recharged" by pumping water from the lower reservoir to the upper reservoir.

There is a need for improved hydroelectric power generation systems.

SUMMARY

Hydroelectric power generation systems described herein can provide for more versatile and facile construction than existing hydroelectric power systems, and with less environmental impact. Such systems can be constructed with precast segments, which can provide for faster construction with more robust structural components, and which can provide for construction in areas that would otherwise be inaccessible or that would require more environmentally-destructive construction.

In an example embodiment, a power generation system includes a reservoir that is at least partially defined by a plurality of precast segments. At least a subset of the precast segments are interconnected via complementary coupling elements. The reservoir is elevated with respect to a fluid supply. The system further includes a flow path providing fluid communication between the reservoir and the fluid supply, a power generation module configured to pump fluid from the fluid supply and into the reservoir via the flow path, and a power conversion module configured to convert kinetic energy of fluid released from the reservoir and travelling through the flow path into electric energy.

The power generation system can be an open-loop system or a closed-loop system. For example, for an open-loop system, the fluid supply can be a natural water supply, such as a river or lake. For a closed-loop system, the system can further include a lower reservoir that houses the fluid supply.

The reservoir(s) of the system can include energy dissipation elements that are configured to disrupt a direction of fluid flow and/or reduce a velocity of flowing fluid that is being pumped into the reservoir. Such energy dissipation elements can be auxiliary precast segments, or can be at least partially defined by one or more auxiliary precast segments. Optionally, an auxiliary precast segment can include a coupling element for mechanical coupling to a precast element of the reservoir. The energy dissipation elements can be disposed substantially vertically with respect to a base of the reservoir and, optionally, provide for the multi-function purpose of supporting a roof that permanently covers or selectively covers the reservoir. Vertically-disposed auxiliary precast segments can be further supported by auxiliary precast segments that extend between the vertically-disposed auxiliary precast segments. For example, transverse auxiliary precast segments can be disposed between the vertically-disposed auxiliary precast segments. The energy dissipation elements can comprise perforated structures, such as defined by one or more precast segments. Energy dissipation elements can also be disposed in a fluid supply for an open-loop system. For example, energy dissipation elements can be disposed in an area at which water is released back to the natural water supply, so as to reduce impact of the flowing water on natural structures and on wildlife.

The reservoir(s) of the system can each include a continuous base, with precast segments forming the reservoir configured to couple to an upper surface of the base. Precast segments forming the reservoirs can include precast segments having at least two opposing surfaces of a substantially triangular or truncated triangular shape. Such shape can provide for the precast segments to be alternately arranged to define a wall of the reservoir and/or to define a buttress structure to support a wall of the reservoir. Other shapes that define straight or curvilinear edges that enable adjacent arrangement to define a buttress structure may also be employed.

The flow path(s) of the system can be defined by at least two fluid conduits that are individually selectable for fluid transfer between the fluid supply and the reservoir. For example, one of the fluid conduits can be utilized for upward flow, and the other for downward flow, with an option to alternate direction in each conduit. At least one dedicated pump can be included at each of the at least two fluid conduits. The fluid pump(s) of the system can be disposed at varying elevations. For example, at least two fluid pumps can be disposed at a conduit that defines a flowpath, the fluid pumps disposed at varying elevations. Optionally, one or more intermediary reservoirs can be included, where the intermediary reservoirs may include aspects constructed through the use of precast segments, such as any of the precast segments described herein. The inclusion of multiple fluid pumps for a flow path and intermediary reservoirs along the flow path can provide for a configuration in which work is distributed throughout the system rather than performed by a single pump. Similarly, intermediate reservoirs can be included along the flow path for downward flow, so as to not overwhelm a lower reservoir or naturally water supply during periods of power generation.

In some embodiments, the fluid pump(s) may be used to force fluid to an upper reservoir to retain the pumped fluid as potential energy and convert kinetic energy of fluid flowing downward into electrical power. For example, in one embodiment, the power generation module and power conversion module may be integrated into a single module that includes a turbine configured to rotate in a first direction to pump the fluid from the fluid supply and into the reservoir via the flow path and to rotate in a second direction to convert the kinetic energy of fluid released from the reservoir into electric energy.

Various configurations of precast segments can be used to construct or define the system. Precast segments can be provided for foundation segment(s) of the reservoir(s), as impound segments configured to encase infill to at least partially define the reservoir(s), and/or as fluid conduit segments to define the flow path(s) of the system. The reservoir(s) can include one or more precast segment(s) defining an outlet port for fluid released from the reservoir and defining an inlet port for fluid pumped into the reservoir. One or more inlet and/or outlet ports can be included. The inlet port can be disposed at a higher elevation than the outlet port.

The power generation system may have the power generation module and power conversion module integrated into a single module that includes a turbine configured to rotate in a first direction to pump the fluid from the fluid supply and into the reservoir via the flow path and to rotate in a second direction to convert the kinetic energy of fluid released from the reservoir into electric energy.

The power generation system may further comprise material flowed and coupled to a precast segment. The material may be positioned over a seam between adjacent precast segments or define an energy dissipation element.

The power generating system may comprise a three-dimensional (3D) material printing system coupled to a precast segment on a base of or at an upper surface of the reservoir. In such an embodiment, the 3D material printing system may access material from a source of material located at the reservoir and transfer the material to a different precast segment via a boom.

A power generation method includes, with a power generation system, transferring fluid from the fluid supply to the reservoir via the flow path, releasing fluid from the reservoir to the fluid supply via the flow path, and storing energy converted by the energy conversion component during fluid release.

In various embodiments, transferring of water from the water supply to the reservoir can occur during a period of low-energy use by a community associated with a power grid that may supply power to or receive power from the power generation system such that the cost of energy is low while water is being pumped upward to the reservoir. Releasing of water from the reservoir to the water supply occurs during a period of high-energy use such that power generated by the power generation system is available to serve the community via the power grid.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Traditional pumped storage facilities typically require complex custom civil designs that are expensive to build, especially in remote mountainous areas. Blasting, excavating, embankment building, and rock-tunneling are examples of costly and time consuming civil construction activities typically involved in building traditional pumped storage facilities, and these activities leave permanent environmental scars on the landscape. Accordingly, there is a need for improved pumped storage systems.

A description of example embodiments follows.

Pumped storage hydropower (PSH) systems that include components constructed from precast segments are proved. As used herein, the term "precast segment" refers to precast modules of particular shape and size formed of a structural material, such as, concrete. Precast segments can include coupling elements to enable the segments to be interconnected during construction of a structure, such as a reservoir or impoundment module. Precast segments can be manufactured off-site, providing for increased control over manufacturing conditions, thereby providing for more robust and uniformly constructed segments for forming a structure, as compared with a structure formed by on-site concrete pouring. For some construction projects, a temporary facility may be constructed to manufacture precast segments on-site, whereby the temporary facility itself may be formed of precast segments.

Furthermore, the cost and time for commissioning a hydropower system can be greatly reduced, and siting opportunities greatly increased, over conventional pumped storage facilities through use of the systems described herein. Additionally, maintaining and decommissioning of such systems by removal of precast modules can also reduce environmental impact over conventional pumped storage facilities.

Figure 1:
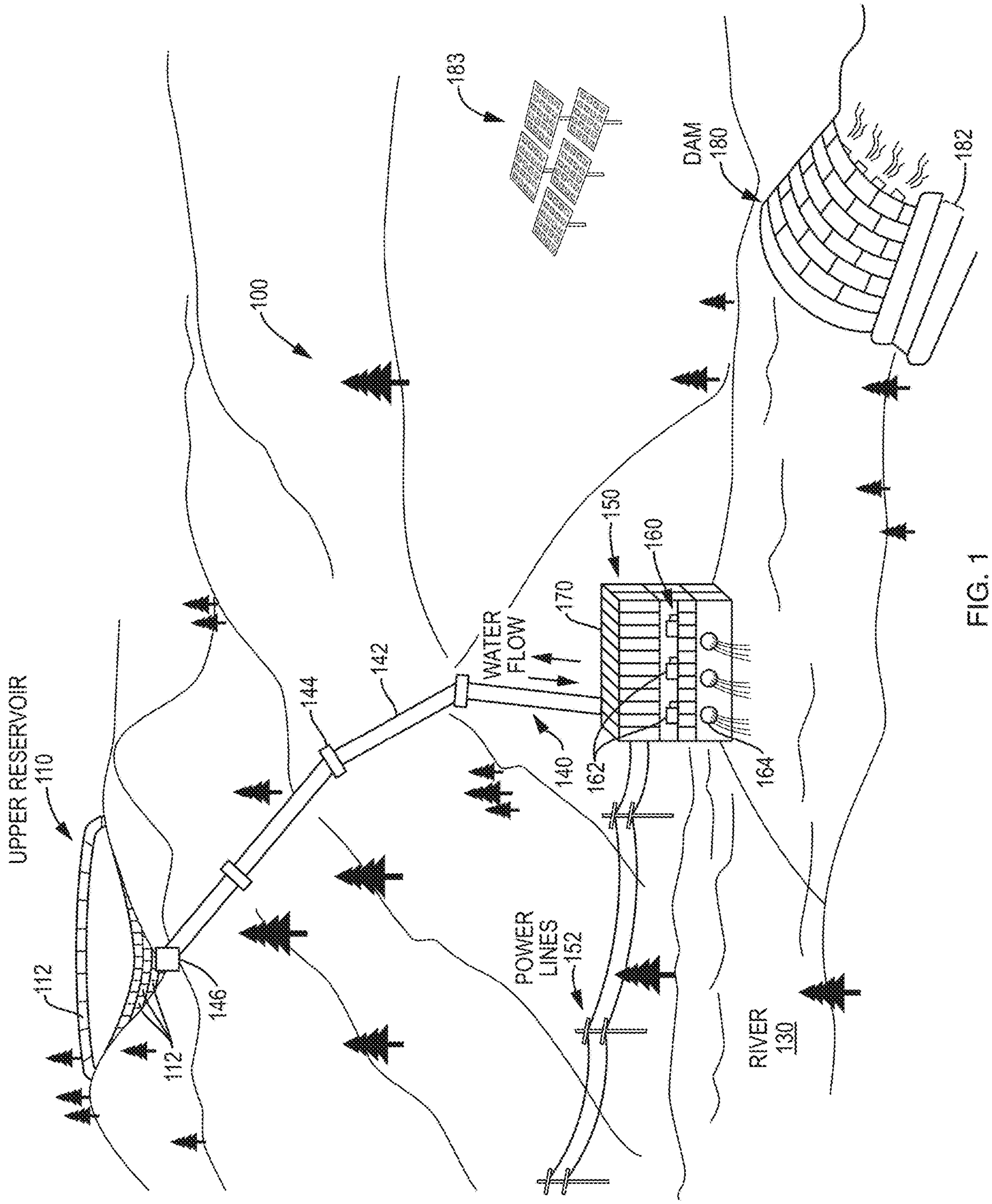
FIG. 1 is a high-level view of an open-loop pumped storage hydropower system that includes component structures that can be formed by modular, precast segments. The elements of FIG. 1 are not to scale.

An example of a pumped storage hydropower system 100 is shown in FIG. 1. The system includes a reservoir 110 that is at least partially defined by a plurality of precast segments 112. The reservoir 110 is elevated with respect to a fluid supply 130, which, as illustrated in FIG. 1 is a river, such as a natural river, but may alternatively be another body of water, either naturally occurring or man-made. Fluid supplies described herein are generally described with respect to the fluid being water; however, pumped storage systems may alternatively employ other types of fluid, in particular, liquids. For example, the fluid can comprise water with additives, such as additives that inhibit evaporation, freezing, growth of bacteria/fungi, etc. Liquids other than water, or water in combination with other liquids, may be desirable to provide for particular performance characteristics or to make use of other resources.

As further illustrated in FIG. 1, the system 100 includes a flow path 140 providing fluid communication between the reservoir 110 and the fluid supply 130. A power generation module 160 is configured to pump fluid from the fluid supply to the reservoir 110 via the flow path 140. A power conversion module 150 is configured to convert kinetic energy of fluid released from the reservoir and travelling through the flow path into electric energy. As illustrated in FIG. 1, the power generation module 160 and power conversion module 150 are included in a singular structure, a powerhouse 170; however, these modules may be included in separate structures and/or at discrete locations within the system. Turbines 162 included within the powerhouse 170 can provide for the collection of kinetic energy of flowing fluid for conversion to electrical energy. The turbines 162 can additionally or alternatively be used as turbine pumps, so as to pump water from the fluid supply 130 to the reservoir 110.

A power generation module can include one or more pumps at any location along the flow path 140 to provide for movement of fluid, typically water, from a low-elevation supply to a high-elevation impoundment structure. A power conversion module can include one or more turbines located at any location along the fluid path 140 to provide for capturing of kinetic energy as water is released from the high-elevation impoundment structure and returned to the low-elevation supply.

The power generation module 160 can be further connected to energy distribution elements 152, such as power lines, to provide for integration with an electrical grid. The pumped storage hydropower system 100 can be further integrated with other hydropower and/or renewable energy systems. For example, as illustrated in FIG. 1, a hydropower dam 180 is included in the system, which can optionally be integrated with the powerhouse 170 to supply energy that may be needed by the power generation module 160 when pumping fluid up and into the reservoir 110. Alternatively, or in addition, a solar power farm 183 or wind farm can be included. Further alternatively, or in addition, hydrogen fuel cells and/or thermal renewal energy sources (not shown) may be located at the pumped storage hydropower system 100 to provide power to the power generation module 160 to pump fluid or add supplemental power to the electrical grid.

As illustrated in FIG. 1, the hydropower dam 180 and an associated spillway 182 are formed of modular precast segments, such as those shown and described in U.S. Pat. No. 9,730,431, the entire teachings of which are incorporated herein by reference. A power generator turbine in the dam, which may be housed in a precast segment as further described in U.S. Pat. No. 9,730,431, can convert moving water into electrical energy that, in turn, may drive water pumps (e.g., of power generation module 160) to pump water at the dam through a fluid conduit providing for a flow path 140 to the reservoir 110. As illustrated in FIG. 1, the reservoir 110 is provided by an impoundment structure and may be alternatively referred to herein as an impoundment module. The water at the impoundment module may be released for conversion to electrical energy through power generator turbine(s) (e.g., of power conversion module 150) on return to the elevation level of the dam.

The system can further include fluid conduits 142 supported by thrust blocks 144, each of which can be comprised of modular precast segments as further described herein. An intake/outlet port 146 is disposed at the reservoir 110 to provide for fluid communication between the fluid conduit 142 and the reservoir 110. Intake and/or outlet ports 164 can also be included at the power conversion and power generation modules 150, 160.

A pumped storage hydropower system can be an open-loop or closed-loop system. An open-loop system is illustrated in FIG. 1.

As used herein, the term "open-loop" refers to a system in which a naturally-occurring or man-made body of water is provided as a fluid supply for the system. Typically, the naturally-occurring body of water is a flowing body of water, such as a river, and is located at a lower elevation than that of a reservoir to which the fluid is pumped. However, man-made bodies of water, such as canals, can alternatively be used in open-loop systems. Examples of suitable water supplies include lakes, rivers, reservoirs, and oceans.

As used herein, the term "closed-loop" refers to a system without access to a naturally-occurring or man-made body of water. Typically, closed-loop systems comprise two reservoirs (e.g. two man-made impoundment structures) constructed at different elevations. The term "without access to" means that water to be pumped from a lower reservoir to an upper reservoir is taken from the lower reservoir constructed for such a purpose, though fluid retained in the lower reservoir may initially, periodically, or on an event-driven basis be obtained (e.g., pumped from) a naturally-occurring or man-made body of water or other fluid supply.

Fluid in a closed-loop system may be more diverse from that of an open-loop system in that the fluid is not typically released back into the environment that surrounds the pumped storage hydropower system. For example, the fluid in a closed-loop system may be unclean fluid, such as waste water, including sewage waste water and non-sewage waste water, or other forms of contaminated water unfit for unfiltered release into the environment. In some closed-loop system embodiments, the system may be equipped with filtration subsystem(s) (not shown) to convert the initial state of the unclean fluid into an environmentally safe state to enable release of clean water into the environment. The filtration subsystem(s) may be located at the lower or upper reservoirs or may be in-line with a fluid flow path 140. Moreover, in the case of unclean fluid, the closed-loop system may have protection against the corrosive nature of the initial state of the unclean fluid, which may include liners on precast segments, nanotechnology filler that can withstand corrosion due to the initial state, and special gap filling material that can withstand such corrosive fluid.

Example elevation gains/losses in pumped storage hydropower systems can range from about 100 ft. (30m) to about 10,000 ft. (3000m). The construction of reservoirs, fluid conduits, and associated structures with modular precast segments can advantageously allow for easier and safer construction in areas with greater elevation gains/losses. The use of modular precast segments can also greatly assist in providing routine maintenance and/or repair the hydropower system by providing for more straightforward replacement of component elements of the system.

Hybrid systems are also possible. For example, a pumped storage hydropower system can have access to a naturally-occurring body of water and simultaneously include two or more man-made reservoirs, each of which can be located at a different elevation with respect to the body of water. Hybrid systems can be particularly useful for construction at locations in which access to an adequate fluid supply from a naturally-occurring body of water is not continuously available. Hybrid systems can include, for example, intermediate reservoirs located between an upper reservoir and a naturally-occurring body of water. Such hybrid systems can provide for flexibility in releasing/harnessing water in a modular manner. Hybrid systems can also be useful for alleviating pump workload(s) over significant elevation gains.

Hydropower pumped storage systems can be integrated with existing power-generation infrastructures as well as with non-power infrastructures, such as those found at ski resorts, quarries, and mines. Ski resorts, quarries, and mines, for example, typically have low-elevation ponds that can be utilized in conjunction with a high-elevation reservoir to create a closed-loop PSH system. Ski resorts with snow making operations typically have existing pumps and piping that can be integrated into the PSH system.

Currently, there are approximately 480 operating ski resorts and more than 1,000 defunct ski resorts in the United States, many of which have snow making equipment and infrastructure that includes a pond, pumps, and piping. Utilization of existing pond, pumps, and piping can reduce PSH installation costs and provide additional revenue streams to the ski areas. Based on information from the U.S. Geological Survey (USGS), over 6,000 mines or quarries were active in 2003. Many quarries have ponds at the lowest elevations of their operation that collect rain and ground water. By utilizing existing industrial sites, many with significant sized ponds and elevation head created by the mining operations, PSH systems can be provided with little additional environmental impact and often in closer proximity to urban centers than traditional pumped storage plants. While ski resorts and quarries are described, precast modular pumped-storage hydropower systems can be provided for reservoirs in other environments.

Figure 2A:
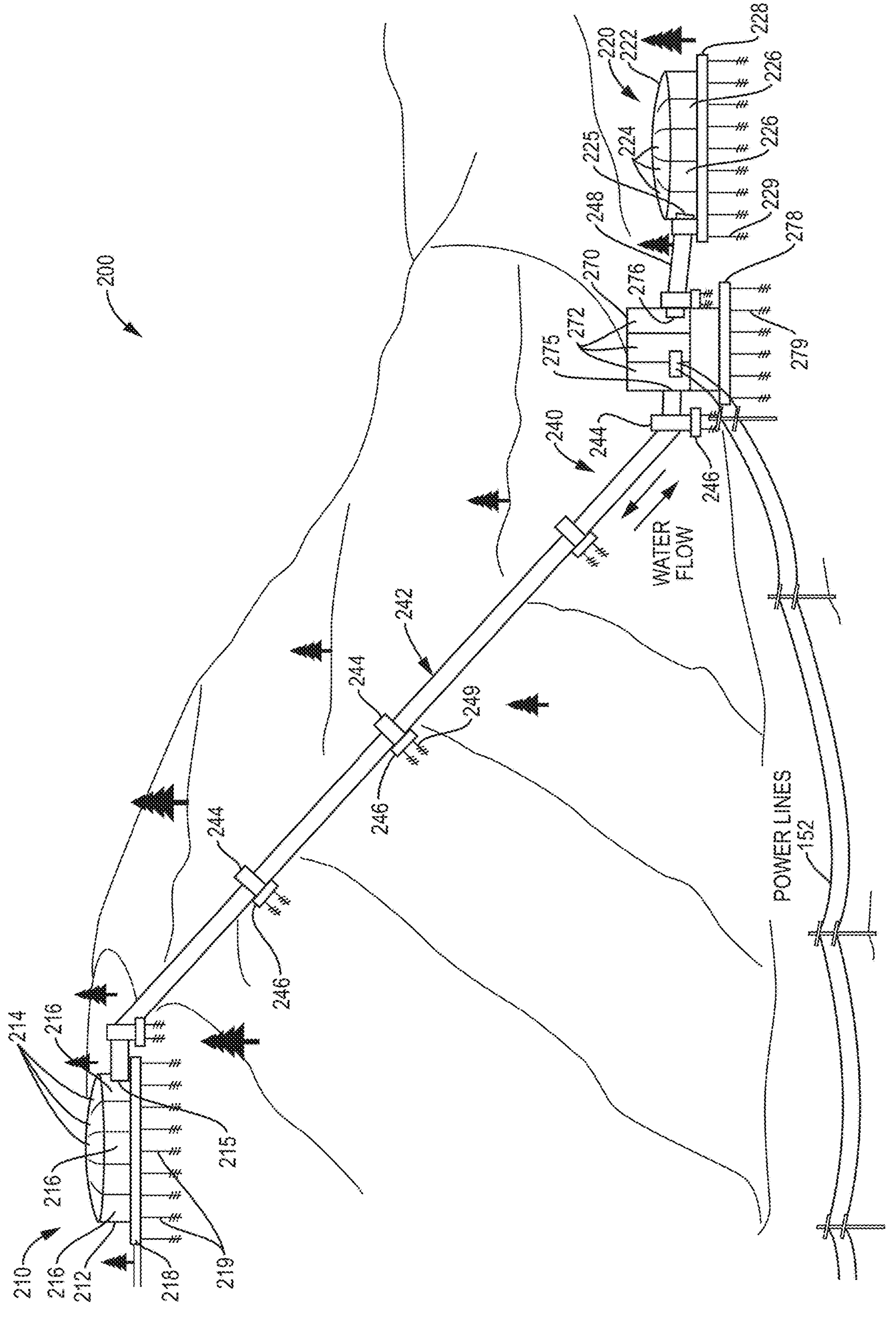
FIG. 2A and FIG. 2B are high-level views of a closed-loop pumped storage hydropower system that includes component structures that can be formed by modular, precast segments. The elements of FIGS. 2A-2B are not to scale.
Figure 2B:
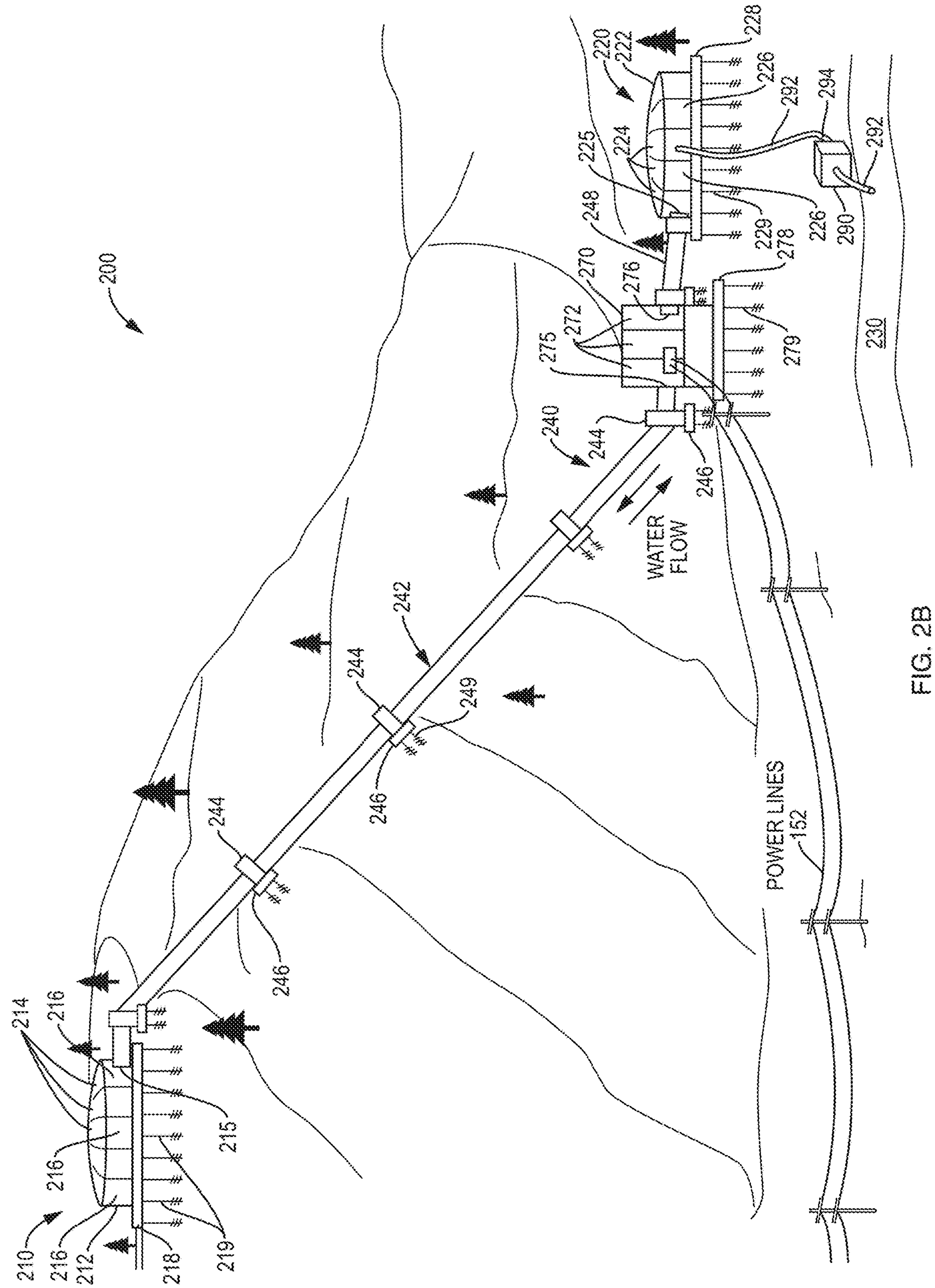

An example of a closed-loop system is illustrated in FIGS. 2A and 2B. The system 200 includes an upper reservoir 210 and a lower reservoir 220. The reservoirs 210, 220 are provided by impoundment structures 212, 222 formed of modular precast segments, including roof module segments 214, 224 and wall segments 216, 226, and foundation modules 218, 228 that can optionally be formed of precast segments. Any or all of the precast segments 214, 224, 216, 226, 218, 228 forming an impoundment structure can include coupling elements or interlocking elements, as further described herein, to provide for interconnection of the segments during assembly.

Additional features that can be included in either a closed-loop or open-loop (or hybrid) system are shown in FIGS. 2A-2B. In particular, foundation modules 218, 228 can optionally be included at various locations in a system. The foundation modules 218, 228 can optionally include underpinning units 219, 229. The underpinning units can be formed of concrete, metal, and/or other materials and can be in the shape of large pins that are placed into the ground to anchor the foundation of the reservoirs. The underpinning units can be positioned substantially transversely with respect to a surface of the ground at which they are located. Foundation modules can be secured to a riverbed with rock anchors or other geotechnical foundation elements. Foundation modules can include linkages to provide for fast erection of additional module types.

For example, after delivery to a project site, precast modules can be secured to an underlying natural structure, for example, rock (e.g., mountain top or quarry rock) with rock anchors or equivalent or similar structural linkages (e.g., caissons) provided as underpinning units. The modules can be interconnected with adjacent modules to assemble a reservoir rapidly. Using precast concrete modules provides many benefits, including, for example: allowing for installation of an upper reservoir on rock without expensive and environmentally-altering blasting or large earth moving operations for embankment construction; higher product quality through batch consistency and controlled curing environments, which can, in turn, provide for increased concrete durability and project lifespan; separating of manufacturing from installation, which can allow for scheduling flexibility and better control of project schedule; and reducing project risk, duration, and cost.

Figure 11A:
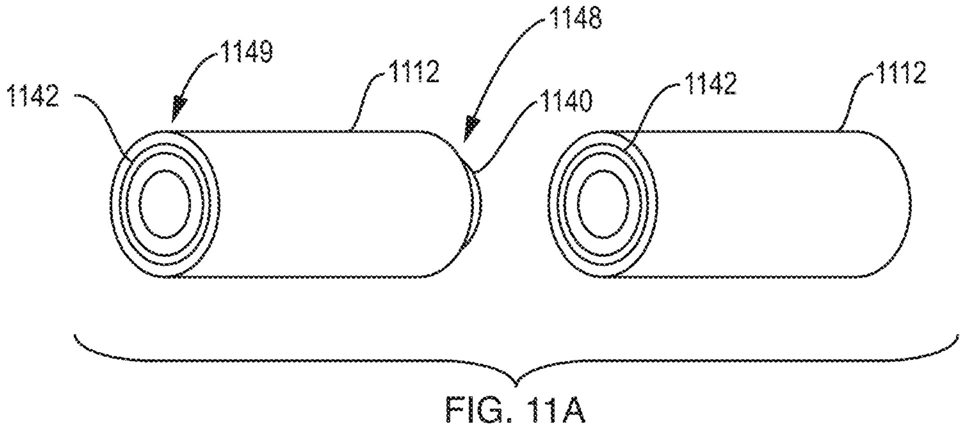
FIG. 11A is a schematic illustrating example fluid conduit segments having coupling elements.
Figure 11B:
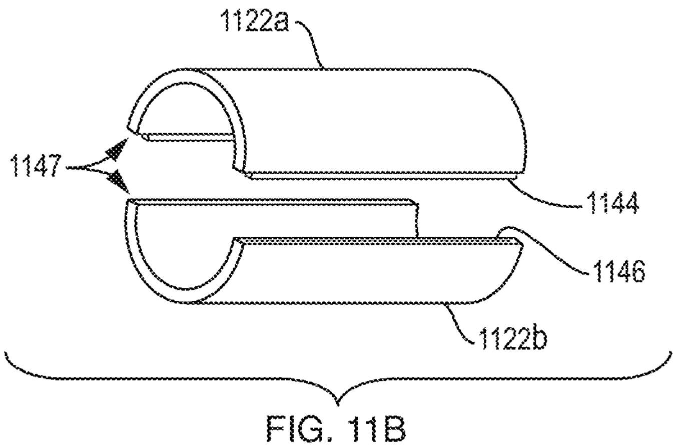
FIG. 11B is a schematic illustrating another example of fluid conduit segments having coupling elements.
Figure 12:
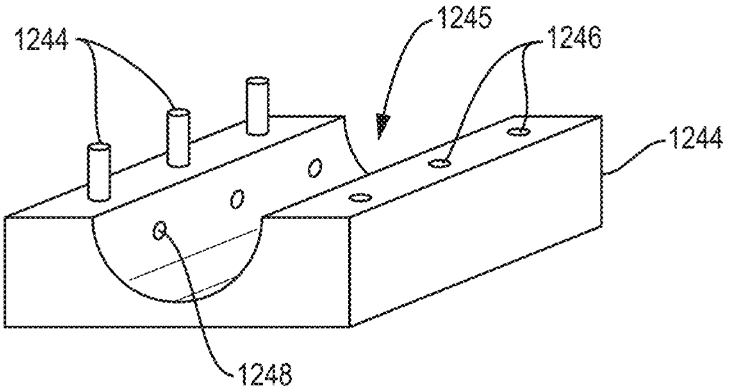
FIG. 12 is a schematic illustrating an example fluid conduit support segment.

As illustrated, a flow path 240 is provided by a fluid conduit 242, which can be formed of precast conduit segments (e.g., FIGS. 11A and 11B), and supported by conduit supports 244, such as thrust blocks, which can be formed of precast conduit support segments (e.g., FIG. 12). The conduit supports can optionally include foundation elements 246 and/or underpinning units 249 to provide for secure installation and anchor the supports to the ground.

A structure 270, such as a powerhouse, housing a power generation module and power conversion module, is further shown in FIGS. 2A-2B. The powerhouse structure 270 can be formed of precast segments 272, and one or more of the precast segments 272 can define a port 275 for connection with the fluid conduit 242. Another precast segment can define a port 276 for connection with an additional fluid conduit 248 for fluid connection with the lower reservoir 220. In an open-loop system, port 276 can be in fluid communication with a conduit leading to/from a natural water supply. Similarly, one or more of the precast segments 216, 226 can define ports 215, 225 to provide for fluid connection to other system components.

Modular pumped-storage hydropower systems can include any or all of the following modules: foundation modules; impoundment modules; generation modules; and, passage modules (alternatively referred to as fluid conduit modules). Precast segments can be used to construct one or more reservoirs or basins to provide for an impound module, one or more turbine housings to provide for a power conversion module, and/or one or more pump housings to provide for a power generation module of a PSH system.

FIG. 2B includes access to a fluid supply, such as a river 230, from which a pump house 290 draws water to provide water via a fluid conduit 292 to the lower reservoir 220. A backflow preventer valve 294 may be employed to prevent water from flowing back to the pump house 290 in an event power to a pump (not shown) in the pump house 290 is interrupted during pumping operations. It should be understood that water may be supplied to the lower reservoir 220 through other means, such as through passive collection from natural rainwater runoff.

It should be understood that any of the pumps or power generating turbines described herein may have co-located (i.e., proximal) or distal redundancy that may be in-line or in parallel, where fluid flow control gates may be employed to direct water to the operating pump(s) or turbine(s).

Figure 3A:
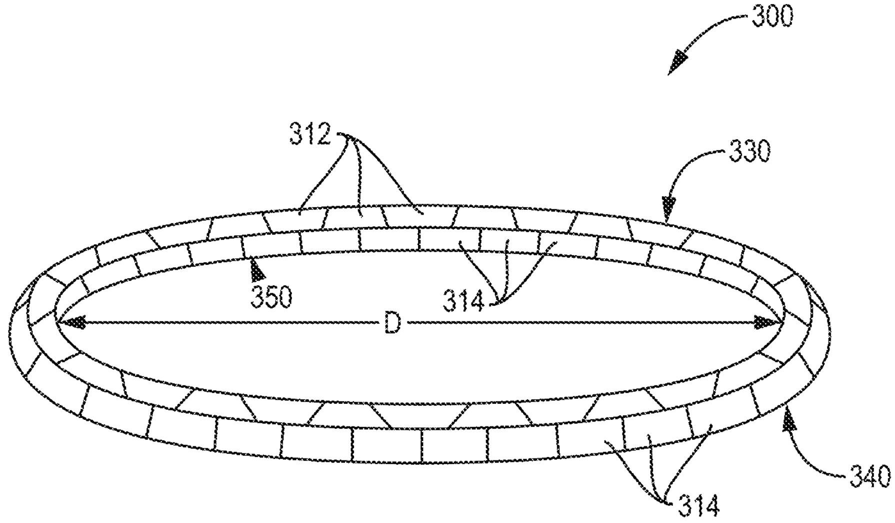
FIG. 3A illustrates an example arrangement of precast segments providing for an impoundment structure. The elements of FIG. 3A are not to scale.
Figure 3B:
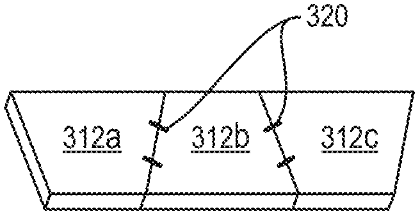
FIG. 3B and FIG. 3C illustrate examples of precast segments.
Figure 3C:
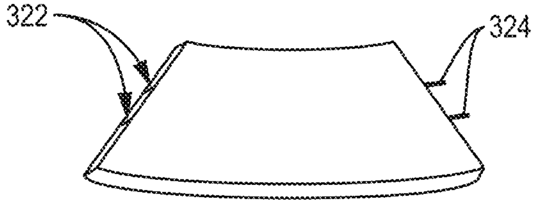

Precast segments particularly suited for constructing an impoundment structure, such as a reservoir, can be included in a system. An example of a reservoir 300 constructed with modular precast reservoir segments 312, 314 is shown in FIG. 3A. The modular precast segments can include precast segments 312 of a substantially triangular or trapezoidal shape such that the segments 312 can be disposed in opposing, complementary orientations for forming a circular structure, including, for example, an upper surface 330 of a reservoir. An example of such segments 312*a*, 312*b*, 312*c* is shown in FIG. 3B. Outer and/or in inner side surfaces 340, 350 of the reservoir can also be formed of segments having a substantially triangular, trapezoidal, or wedge shape, or may be formed of segments having a substantially rectangular shape. An advantage of such precast segments is that construction of a reservoir having a variable diameter D can be easily and straightforwardly constructed on-site, with a number of precast segments being adaptable to provide for a desired size, shape, and dimension of a reservoir for a given location. Alternatively, or in addition, modular precast reservoir segments can be of a curved shape, as shown with respect to segment 316 of FIG. 3B. Segments such as segment 316 can be used to form a circular structure, including, for example, an upper surface 330 of a reservoir.

Modular precast segments can include interlocking elements 320 (e.g., bolt connectors, tongue-in-groove structures, etc.) to provide for interconnection with neighboring segments. Alternatively, or in addition, modular precast segments can include a structure 322, such as a recess, configured to receive an interlocking element, such as a projection 324 extending from a neighboring segment or a bolt linkage. While interlocking elements 320 and interconnection structures 322 are shown with respect to modular precast segments that are shaped to define an impound structure, it should be understood that such interlocking elements and interconnection structures can be included in any modular precast segments providing for construction or assembly of any other structures within a pumped storage hydropower system, including, for example, precast fluid conduit segments, precast conduit support segments, and precast power generation/conversion module segments.

Figure 4A:
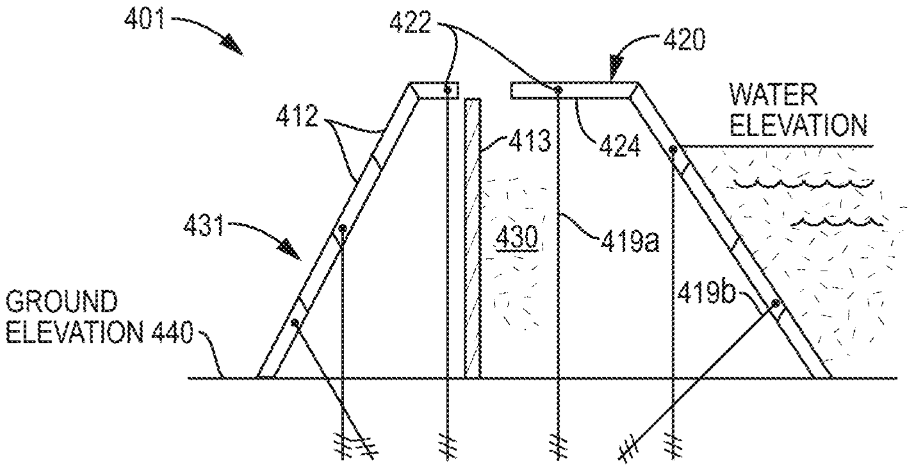
FIG. 4A, FIG. 4B, and FIG. 4C each illustrate a cross-sectional side view of a variation of a wall of an impoundment structure formed of modular precast segments.
Figure 4B:
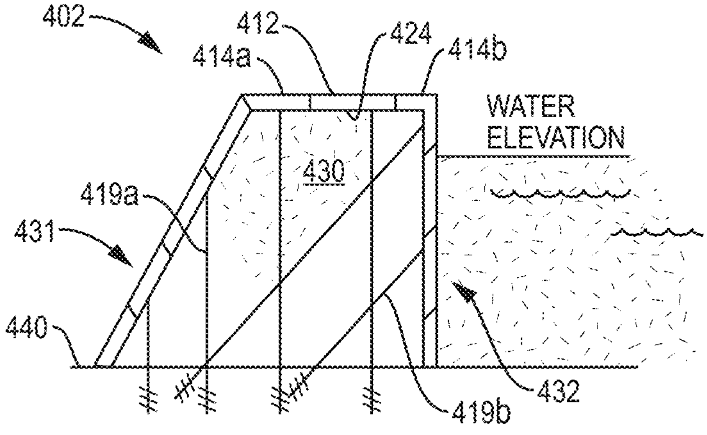

Modular precast segments can be arranged to form a wall of an impoundment structure, as further shown in FIGS. 4A and 4B. The wall 401 of FIG. 4A is formed of precast segments 412, which include underpinning connections 422 for engaging with underpinning units 419*a*, 419*b*. The wall 402 of FIG. 4B is formed of precast segments 412, 414, which also include underpinning units 419*a*, 419*b*, but with such underpinning units 419*a*, 419*b* extending from an inner surface 242 of the assembled precast segments 212.

As illustrated in FIG. 4A, the underpinning units 419*a*, 419*b* can extend through at least a portion of the precast segments (e.g., can be installed by being driven, drilled, cored, or the like, through from an outer surface 420 of a segment 412 or by extending from an underpinning connection 422 provided within or defined by the precast segment). A sleeve (not shown) may be employed for access by and underpinning unit to pass through a port in a precast segment 412 with minimized friction and, consequently, damage to the precast segment 412. The sleeve may be made of plastic, PVC, metal, or other common or custom material.

As illustrated in both FIGS. 4A and 4B, the modular precast segments 412 are configured to encase a fill material 430 to form the wall 401, 402. The underpinning units 419*a*, 419*b* can extend through the fill material 430 and, optionally, through a ground surface 440 and into ground. The underpinning units 419*a*, 419*b* can extend substantially transversely from a surface 424 of the precast segment to which the underpinning unit is connected. Alternatively, or in addition, the underpinning units can be arranged in a particular configuration with respect to a surface 440 of the ground. For example, underpinning units 419*a* are substantially transverse with respect to the ground surface 440, and underpinning units 419*b* are disposed at an acute angle with respect to the ground surface 440.

A reservoir wall 401, 402 can include at least one component wall or sub-wall 431 formed from precast segments such that an orientation of the sub-wall can assist in supporting the structural integrity of the wall 401, 402. For example, sub-walls 431 are angled to provide for buttressing support, while sub-wall 432 of wall 402 is more transversely disposed with respect to the ground so as to provide for a maximized internal reservoir volume. As illustrated in FIG. 4B, precast segments can include corner precast segments 414*a*, 414*b* to provide for additional support and integrity to corners of the assembled wall structures by reducing joints located at corner sections of the wall. Precast segment 414*a* is sized and shaped to provide for an obtusely-angled corner, while precast segment 414*b* is sized and shaped to provide for a right-angled corner.

The reservoir wall 401 may include an interior precast water cutoff wall 413 that is water impermeable. The water cutoff wall 413 may be formed of precast segments that are coated or filled with a water impermeable material that will not be corroded by moisture. Alternatively, nanomaterials may be applied to precast segments to give the precast segments a water impermeable characteristic. Though not shown in FIG. 4B, the reservoir wall 402 may also include a water cutoff wall 413. Additionally, a moisture sensor (not shown) may be co-located at the water cutoff wall 413, or the water cutoff wall 413 itself may be configured to be a moisture sensor, to notify appropriate personnel that an unfavorable condition may be developing.

Figure 4C:
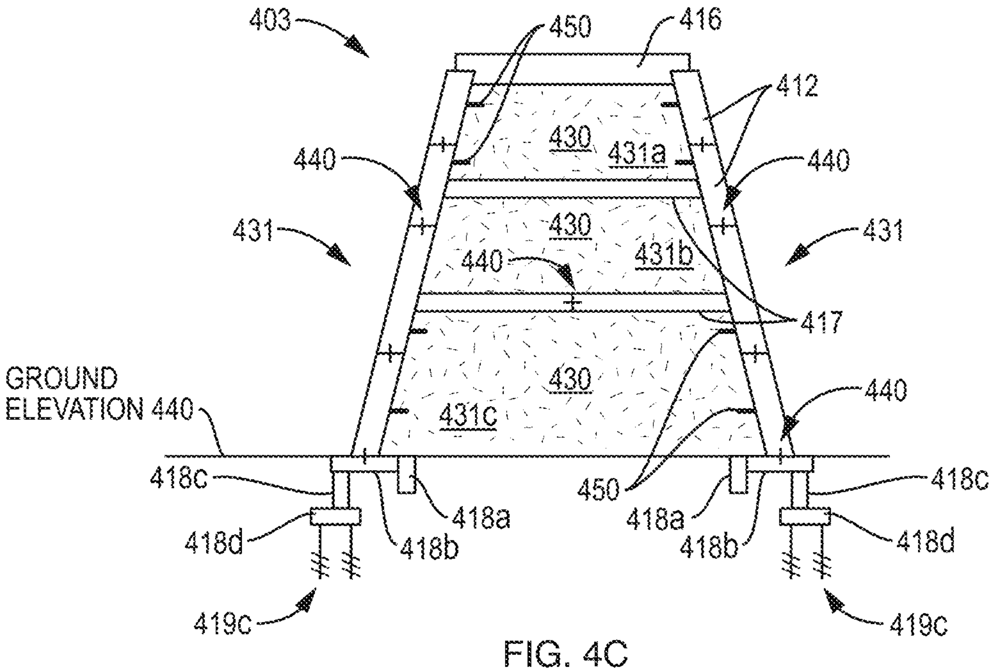

Another example of a reservoir wall 403 is shown in FIG. 4C. As illustrated, the wall 403 includes precast segments 412 connected by interlocking elements 440. A precast cap segment 416 is further included, and precast segments 412 together with precast cap segment 416 encase a structural fill material 430. Optionally, intermediate precast segments 417 are included among layers 431*a*, 431*b*, and 431*c* of fill material 430. Such intermediate precast segments can provide for additional structural integrity to the assembled wall. For example, intermediate precast segments can be configured to abut the segments 412 forming sub-wall 431 at locations corresponding to a midsection of a given precast wall segment, so as to provide bracing support to the segment and overall structure. Precast segments can further include projections 450 extending from an inwardly-oriented surface. The projections 450 can extend into the structural fill 430 to provide for additional support for the assembled wall structure.

The reservoir wall 403 further includes precast foundation segments 418*a*, 418*b*, 418*c*, and 418*d*. At least one of the foundation segments 418*b* can be oriented substantially transversely to a lower surface of the wall 431, with wall segments 418*a*, 418*c*, 418*d* oriented to provide support for foundation segment 418*b*. Optionally, underpinning units 419*c*, such as rock bolts, can be included at any of foundation segments 418*a-d*. The inclusion of foundation segments 418*a-d* can prevent the sub-walls 431 from sinking into a ground at which the wall is constructed and can further help with maintaining an angled orientation of the sub-wall 431, particularly where interlocking elements 440 are included such that relative side-to-side movement among segments is prevented or inhibited.

Figure 5A:
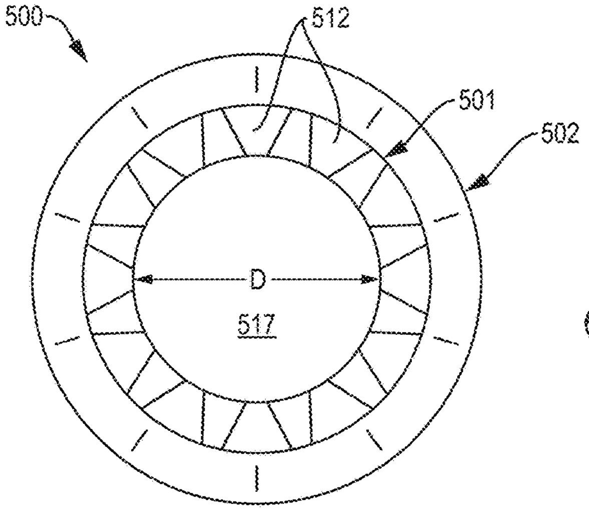
FIG. 5A illustrates a top view of a reservoir constructed with precast segments.
Figure 5B:
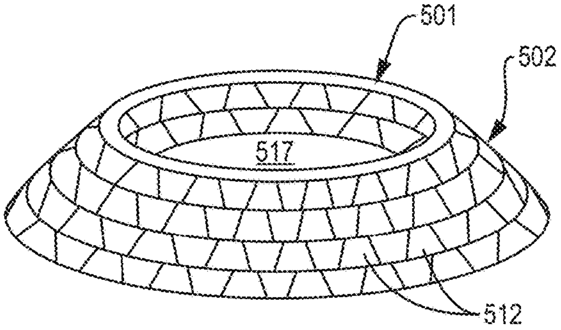
FIG. 5B illustrates a side elevation view of the reservoir of FIG. 5A.
Figure 5C:
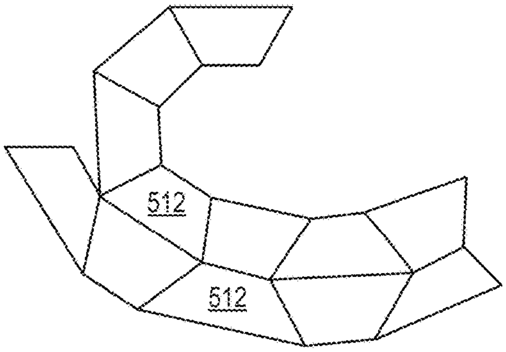
FIG. 5C illustrates a top view of a partially-constructed reservoir with modular precast segments.

A reservoir can be constructed to include any number of layers of precast segments, and construction of a reservoir can be adapted to a surrounding environment. A reservoir 500 can include an upper surface 501, which as shown in FIGS. 5A-5F, can be formed of a layer of precast segments 512 and can define a substantially circular reservoir 500 having a diameter D of an internal base 517. A volume of a reservoir can range from about 1000 gallons to about 100 billion gallons, but can be adapted to any volume as defined by a diameter, depth, and other possible shape features. For example, the reservoir of FIGS. 5A and 5B is shown to be substantially circular; however, other shapes are possible, including, oblong, polygonal, etc. As shown in FIG. 5B, a side surface 502 of the reservoir 500 is formed of four layers, or rows, of precast segments; however, any number of layers or rows can be provided depending upon an intended size of the reservoir. Particularly for large reservoirs, the manipulation of precast segments 512 of one or more defined sizes can provide for significant improvements in construction time and effort, as well as flexibility in adapting a reservoir to an installation site. The precast segments 512 can be assembled in rows or layers, as shown in FIG. 5C and can be assembled to provide for non-symmetrically shaped reservoirs.

Figure 5D:
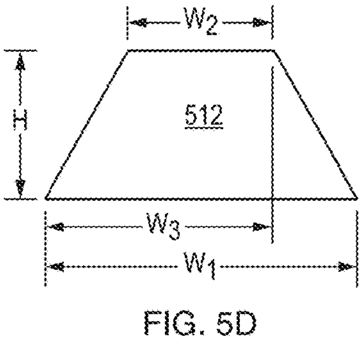
FIG. 5D is a schematic of a precast segment of the reservoir of FIG. 5A.

The precast segments can be of a substantially trapezoidal shape, having a height H, a width $W_1$ at a longer edge, a width $W_2$ at a shorter edge, and, optionally, a width $W_3$ that can be defined to provide an asymmetrical trapezoidal shape, as shown in FIG. 5D. In an example embodiment, a height H of a precast segment can range from about 4 ft to about 40 ft. A width $W_1$ of a precast segment can range from about 1 ft to about 40 ft. A width $W_2$ of a precast segment can range from about 8 ft to about 40 ft. However, parameters for H, $W_1$, and $W_2$ can be adjusted to provide for precast segments of any size feasible for transport or on-site manufacturing. The H, $W_1$, and $W_2$ dimensions may be standard or customized for a particular project (i.e., a pumped storage hydropower system) and any unique physical requirements. The thickness of a precast segment in some embodiments may be about 6 inches to multiple feet (e.g., 4 ft to 40 ft) and may be engineered to withstand a pressure produced by fluid to be impounded. Multiple precast segments may be coupled together in parallel arrangement to add thickness, where coupling elements of the type described herein may be employed. Multiple angles of corners of the precast segments (i.e., various shapes) may be selected on a given construction project to enable precast segments to be assembled to form the reservoir 500.

Figure 5E:
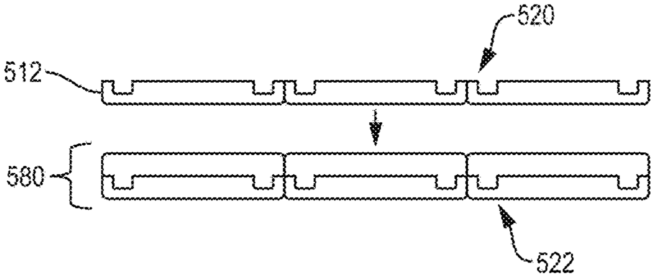
FIG. 5E is a cross-section view of assembled precast segments.

FIG. 5E is a side view that shows that precast segments can further include interconnection structures 520, 522, such as male 522 and female 520 linkages, at a surface or edge of the segments to provide for coupling to other segments to form multi-layer structures and/or interconnected layers 580.

Figure 5F:
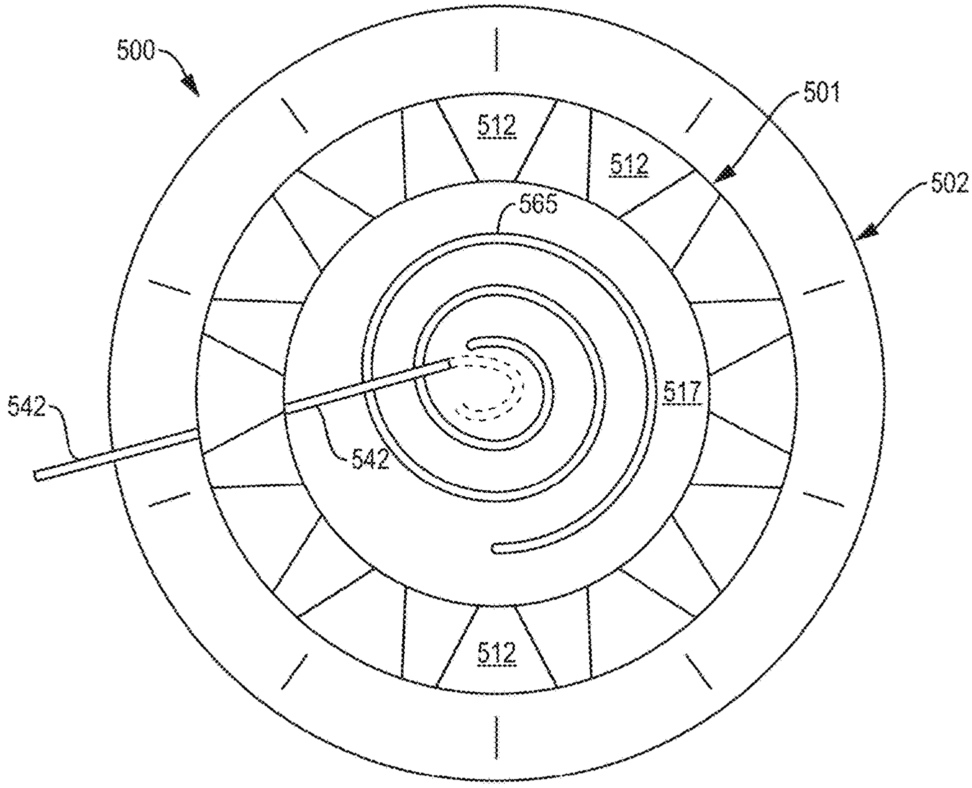
FIG. 5F is a top view of a reservoir constructed with precast segments that includes a water control directional diffuser.
Figure 5G:
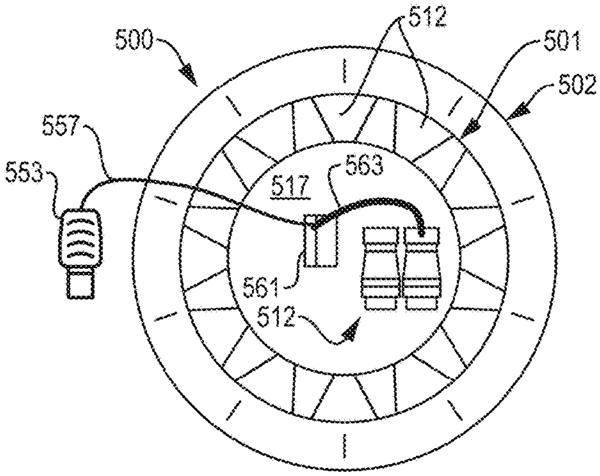
FIGS. 5G and 5H are top views of a reservoir constructed with precast segments that includes a three-dimensional (3D) materials printer affixed to segment(s) of the base (5G) or retainer wall (5H).
Figure 5H:
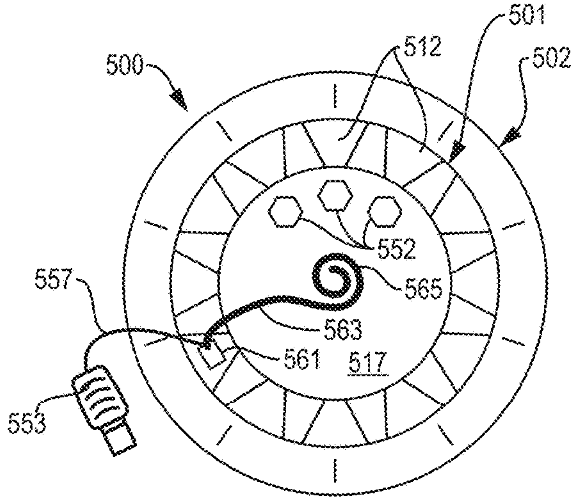

FIG. 5F-H are top views of the reservoir 500 that includes therein precast segments that define a water control directional diffuser 565. In one embodiment (FIG. 5F), the diffuser 565 may define a spiral shape by a series of precast segments, fixedly coupled to an internal base 517 of the reservoir 500, that have a height of approximately one foot (0.3 m) to many feet, such as three feet (about one meter) or many more. The diffuser 565 causes water or other fluid released into the reservoir from a fluid conduit 542 to change from a linear direction to a swirling direction, thereby serving to diffuse force of flowing fluid from projecting onto any particular surface of the reservoir 500.

In an example embodiment, precast segment(s) that form a portion of the internal base 517 may provide complementary coupling elements, such as sockets (not shown) defined therein with protective liners. A three-dimensional (3D) materials printing system 561 (FIGS. 5G and 5H) may be coupled to the precast segments(s) using the 3D material system's own complementary coupling elements, such as plug elements (not shown) with protective sleeves. The 3D materials printing system 561 would be used to flow cement or other materials within the reservoir 500 via a boom 563 for various purposes during construction or at times of maintenance.

A truck 553 or other source of materials that would be used by the 3D materials printing system 561 may be positioned external from the reservoir 500 and have material flow to the 3D materials printing system 561 via a fluid flow hose 557 or other fluid flow path.

In reference to FIG. 5G, during construction or periods of construction, the 3D materials printing system 561, for example, may pour grout or other material to seams between adjacent precast segments 512 on the base of the reservoir, where only a few precast segments 512 are illustrated and are not necessarily shown to scale or shape as other sizes or shapes of precast segments may be deployed. During maintenance, the 3D materials printing system 561 may also be used to replace a pre-cast segment 512 by printing a new segment in place if such replacement technique is, for example, deemed more efficient than manufacturing a precast segment offsite and transported to the reservoir 500 for replacement.

In reference to FIG. 5H, during construction or periods of construction, the 3D materials printing system 561, for example, may be located on precast segments 512 of the upper surface 501. The 3D printing system 561 may use its boom 563 to provide material flowed and coupled to a precast segment, such as material positioned over a seam between adjacent precast segments or defining an energy dissipation element. In an example embodiment, the 3D printing system 561 uses its boom 563 to pour a hardening material, such as cement or concrete, to create energy dissipation element(s), such as the spiral fluid flow diffuser 565 or a different form of a fluid flow diffuser 552. If the 3D printing system 561 has a vision subsystem (not shown) or other intelligence subsystem with appropriate sensor, the 3D materials printing system 561 may operate more autonomously.

The 3D printer subsystem may also be employed to apply fluid or material to the reservoir that is unhealthy for human exposure, such as a nanotechnology coating or chemical treatment fluid. The 3D printing system 561 or its boom 563 may be suspended from a crane (not shown) that is located outside of the reservoir 500.

Precast segments can be of varying shapes and sizes. Additional examples of precast segments, and assembly of such precast segments to form a wall of an impoundment structure are shown in FIGS. 6A-6E. It should be understood that the precast segments of FIGS. 6A-6E can be used to form other structures of a hydropower pumped storage system, such as a powerhouse, reservoirs, supports, and conduits. It should be further understood that the interlocking elements illustrated with respect to the precast segments of FIGS. 6B-6E can be included in or on precast segments of any other shapes, and in or on precast segments provided for assembly into any other structures for a hydropower system. For example, the trapezoidal precast segments of FIG. 3A, and the conduit segments and support segments of FIGS. 11A,11B, and 12 can include keyway linkages and/or bolt linkages as shown in FIGS. 6B-6E.

A wall 600 of an impoundment structure includes precast segments 612, 614, and 616. Precast segment 612 is of a substantially rectangular or square shape, as further illustrated in FIG. 6B. Precast segments 614 and 616 are each of substantially triangular shape, as further illustrated in FIGS. 614 and 616. Precast segment 612 can be particularly suited for constructing a rectilinear portion 620 or portions of a structure, while precast segments 614, 616 can be particularly suited for construction a buttress 630 or at least an outer portion of a buttress wall providing for additional structural support. The precast segments can be assembled to form a wall having a height H and a width W for constructing an impoundment structure or reservoir. In an example embodiment, a height of a reservoir can range from about 10 ft to about 80 ft, and a width of a reservoir can range from about 80 ft to about 8 miles. It should be understood that these and other dimensions and volumes may be different from those presented herein as a function of a particular construction project.

Figure 6E:
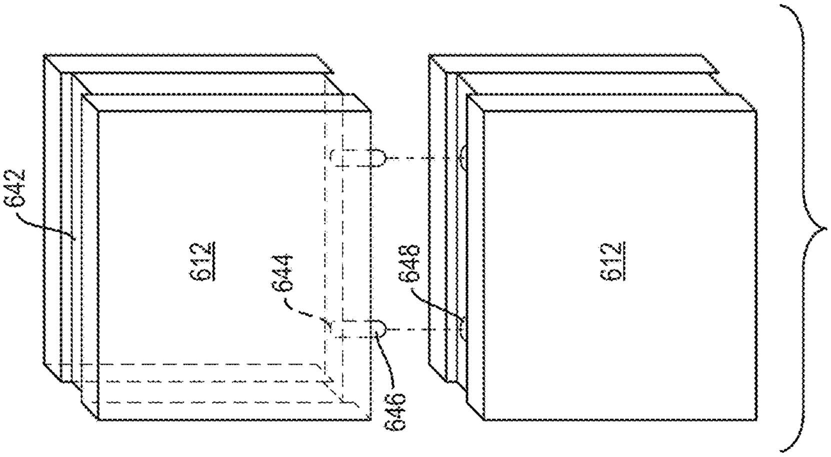
FIG. 6E illustrates assembly of precast segments with interlocking elements.
Figure 6B:
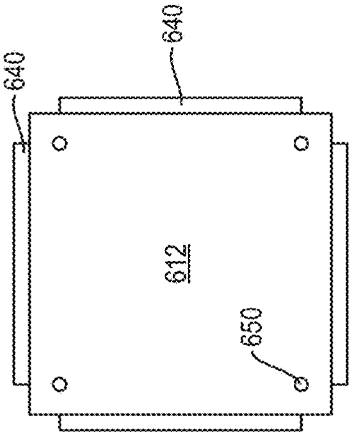
FIG. 6B illustrates an example precast segment that can be used to form the impoundment structure of FIG. 6A or to form other elements of a pumped storage system that can be assembled with modular precast segments.
Figure 6C:
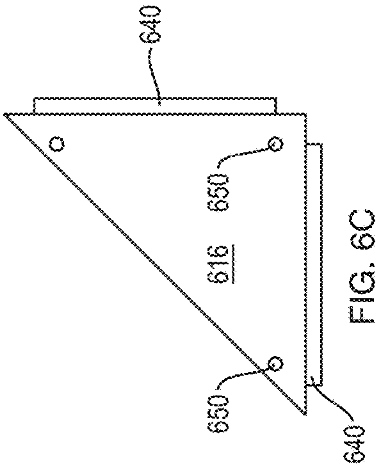
FIG. 6C illustrates another example precast segment that can be used to form the impoundment structure of FIG. 6A or to form other elements of a pumped storage system that can be assembled with modular precast segments.
Figure 6D:
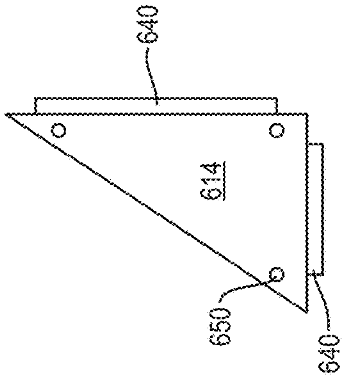
FIG. 6D illustrates yet another example precast segment that can be used to form the impoundment structure of FIG. 6A or to form other elements of a pumped storage system that can be assembled with modular precast segments.
Figure 6A:
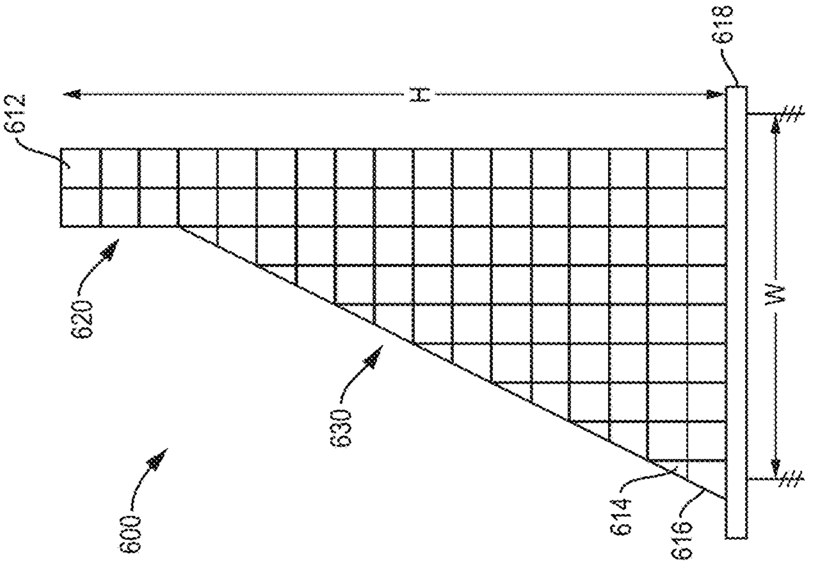
FIG. 6A illustrates a side view of a wall for forming an impoundment structure.

As illustrated in FIGS. 6B-6E, precast segments can include keyway linkages 640, 642, including protruding structures 640 and complementary receptacle structures 642. The keyway linkages 640, 642 can be structures that are integrally formed as part of the precast segment 612, 614, 616. Alternatively, or in addition, precast segments can include dowel linkages 644, 648, with which dowels 646 can be used as interlocking elements, as illustrated in FIG. 6E. As another alternative, precast segments may include cable linkages. Precast segments can include bolt linkages 650. Any or all of keyway linkages 640, 642, dowel linkages 644, 648, and bolt linkages 650 can be included in a precast segment to provide for interconnection with other precast segments. For example, a precast segment can have keyway linkages on at least two of four side surfaces and dowel linkages on the remaining two side surfaces.

Figure 7:
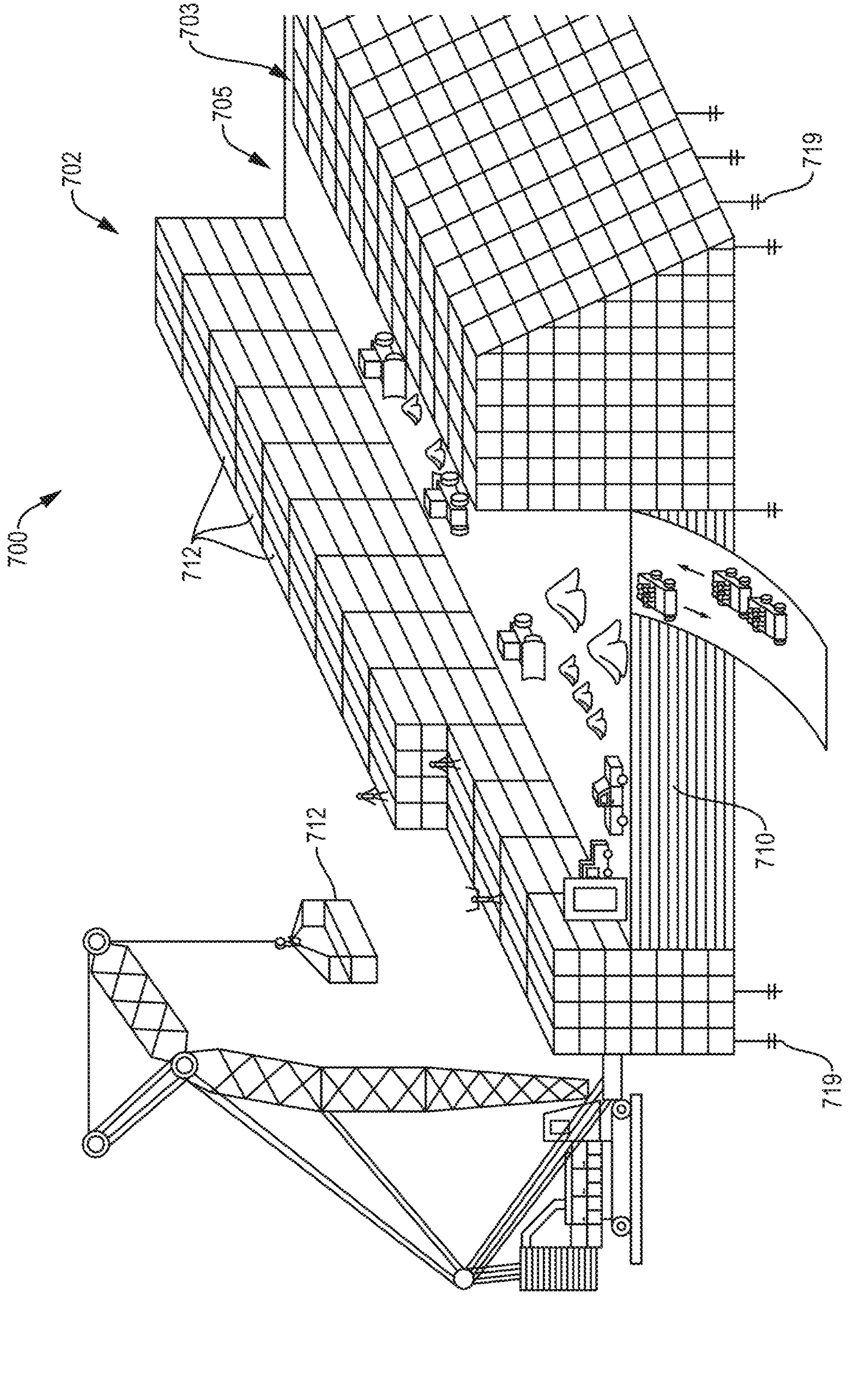
FIG. 7 is a high-level view illustrating construction of an impoundment structure with modular precast segments.

Impoundment structures can include one or more wall structures formed of precast segments. For example, as shown in FIG. 7, a wall 700 can include a component wall 702 for forming an inner portion of an impoundment structure, and a component wall 703 for forming an outer, buttress portion of the impoundment structure. The walls 702, 703 can be disposed some distance apart, with a gap 705 therebetween being filled by structural fill 710, such as rolled, compacted concrete (RCC), gravel, crushed stone, etc. Underpinning units 719, such as rock bolts, can be included to anchor at least a lower layer of precast segments to an underlying ground.

The movement of water through the pumped storage system, in both upward and downward directions, can be at a high velocity. Energy dissipation elements can be included in a reservoir and/or at a natural water supply to disrupt a direction of fluid flow, to reduce a velocity of flowing fluid, or both. Examples of energy dissipation elements are shown in FIGS. 8A and 8B.

Figure 8C:
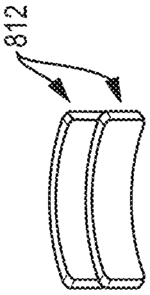
FIG. 8C is a perspective view of another example of modular precast segments for use in constructing an impoundment structure.
Figure 8B:
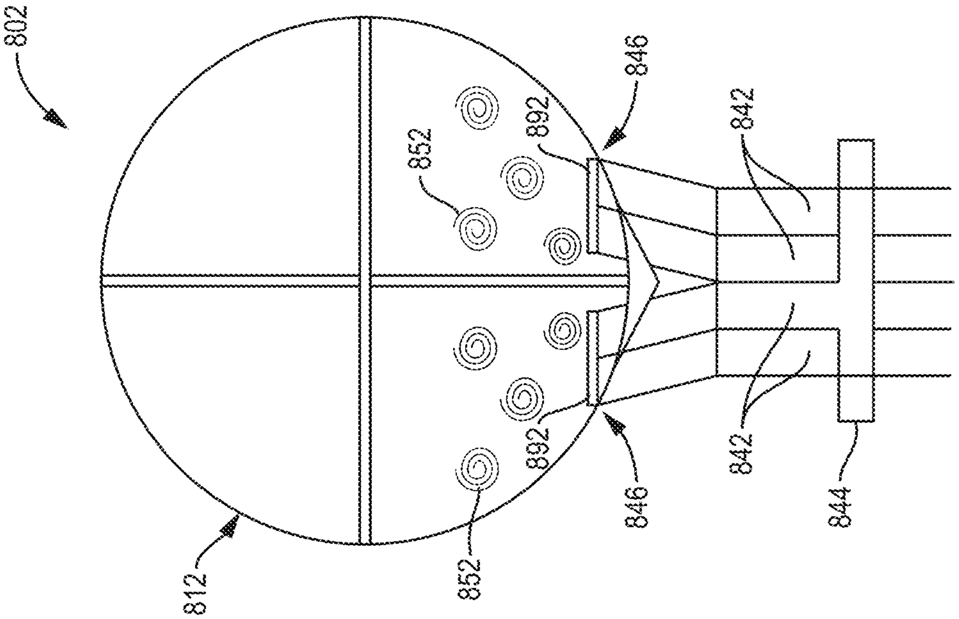
FIG. 8B is a top view of another example reservoir that includes energy dissipation elements.
Figure 8A:
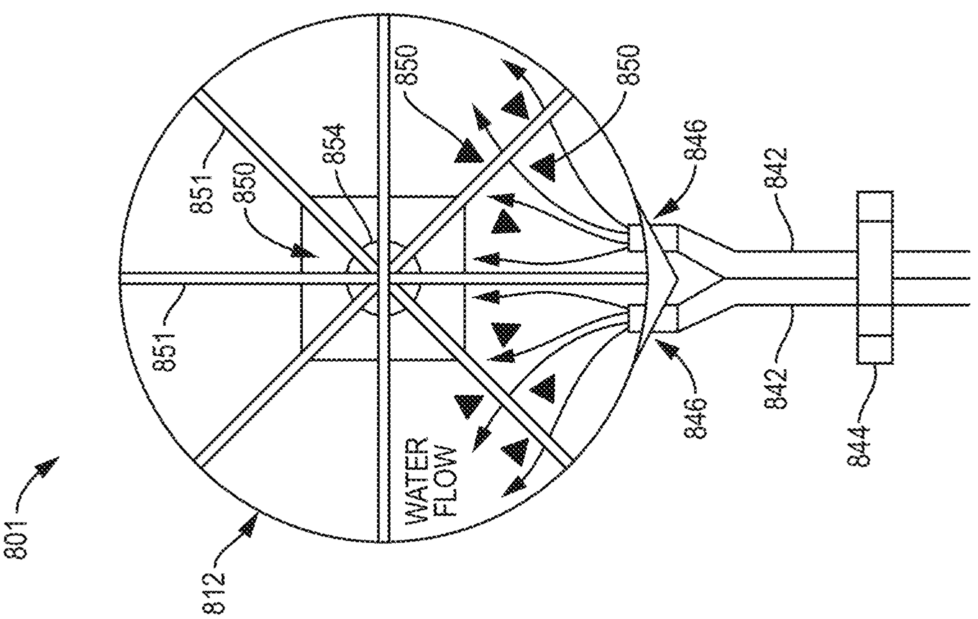
FIG. 8A is a top view of an example reservoir that includes energy dissipation elements and roof support elements.

In particular, a reservoir 801 shown in FIG. 8A is formed from precast segments 812. The precast segments 812 are also shown in FIG. 8C and illustrate another example configuration of precast segments that can be used to construct an impoundment structure or reservoir. The precast segments 812 are of a curvilinear shape and can include interconnecting elements (not shown in FIG. 8C) as described with respect to other precast segments (e.g., as shown in FIGS. 3B-3C and 6B-6E). Interconnecting elements can also be referred to herein as coupling elements or linkages. At least one precast segment can define at least one port 846 providing access from a fluid conduit 842 to an interior portion of the reservoir. Energy dissipation elements 850 are included within the reservoir 801. The energy dissipation elements, as illustrated in FIG. 8A, are substantially triangular in cross-sectional shape and are oriented with respect to the inlet ports 846 such that water flow entering the reservoir is disrupted by the energy dissipation elements 850. Energy dissipation elements can be located throughout an interior portion of the reservoir, or, as illustrated in FIG. 8A can be concentrated in a portion of the reservoir that is closest to ports 846.

Another example of a reservoir 802 including energy dissipation elements is shown in FIG. 8B. The energy dissipation elements 852 are substantially circular in cross-sectional shape (or cylindrical in three-dimensional shape).

Reservoirs can include varying numbers of ports and can connect with varying numbers of fluid conduits. For example, as illustrated in FIG. 8A a flow path is formed from two fluid conduits 842, which bifurcate shortly before entry to reservoir 801. Two ports 846 are provided, each of which provides for connection with one of the two fluid conduits 842. The fluid conduits can be formed of precast segments, as further described herein. Conduit support segments 844 can also be formed of precast segments, as further described herein.

As illustrated in FIG. 8B, a flow path is formed from four fluid conduits 842, with two ports 846 provided, each of which provides for connection with two of the four total fluid conduits. The modular nature of precast segments can provide for flexibility in accommodating varying numbers of fluid conduits. For example, a conduit support 844 can include varyingly selectable numbers of conduit support segments to accommodate supporting one, two, three, four, etc. fluid conduits. Redundancy in fluid conduits can be advantageous. For example, if one fluid conduit is structurally comprised, a remainder of the fluid conduits can enable a hydropower pumped storage system to continue functioning while the compromised fluid conduit is repaired or replaced. Fluid conduits 842 can also be individually-selectable by a system. For example, a pump (e.g., pumps 990, FIG. 9C) can be disposed within or otherwise dedicated to a particular conduit such that activation of the pump provides for fluid transport through that particular conduit. Valves 892 included at each port can also provide for selective control of conduit operation. Valves 892 can be in an open configuration during periods of fluid transport, and in a closed configuration during periods of fluid storage.

A reservoir can further include a roof support structure 850 to support roof elements 851. Roof elements 851 are shown as being transparent for the purposes of illustrating energy dissipation elements disposed within the reservoir 801. As illustrated, the roof elements 851 are wedge-shaped roof components, but may be of other shapes. The roof elements can be individually retractable by an actuator 854, such as a motor, which can be disposed within the roof support structure 850 and/or at other locations within the reservoir. For example, the actuator can cause one or more of roof segments 851 to rotate such that the roof elements 851 are stacked or partially stacked with respect to one another to expose a portion of the reservoir.

It can be advantageous to include a roof on a reservoir structure to prevent water loss from evaporation. A roof made of glass or other transparent material can further provide for a greenhouse effect to warm water impounded in the reservoir. Such an effect can be advantageous in colder climates to prevent freezing, particularly for fresh water systems. Having a roof with retractable roof components 851 can provide for various functions, including water level control, rainwater collection, and top-side access to an interior portion of the reservoir.

Optionally the roof segments 851 can be formed of varying materials. For example, a subset of roof segments 851 can be formed of glass or other transparent material to enable light access, while another subset of roof segments 851 can be formed of a metal or other reflective material to prevent water in the reservoir from heating to an undesirable temperature. Such a configuration can provide for seasonal adjustments. For example, a majority of the reservoir can be covered with transparent roof elements in winter (e.g., reflective roof components can be stacked to one or few wedge area(s), while transparent roof elements are arranged to substantially enclose the reservoir), while a majority of the reservoir can be covered with reflective roof elements in summer (e.g., transparent roof components can be stacked to one or few wedge area(s) while reflective roof elements are arranged to substantially enclose the reservoir). Similarly, in cold weather environments, active heating elements powered by electricity produced by the pumped storage hydropower system 100 (FIG. 1) or by an auxiliary power generating system, such as a solar power or wind turbine system (not shown) may be employed to prevent freezing of the fluid anywhere within the pumped storage hydropower system.

Figure 9A:
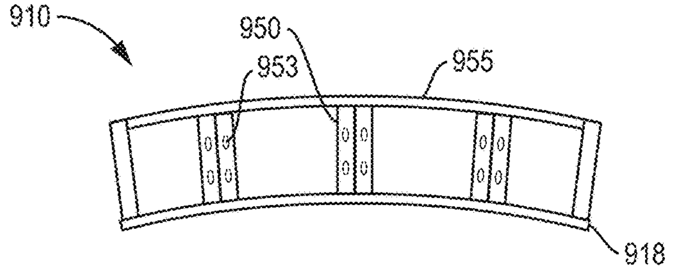
FIG. 9A is a schematic of a cross-section of a reservoir including energy dissipation elements.
Figure 9B:
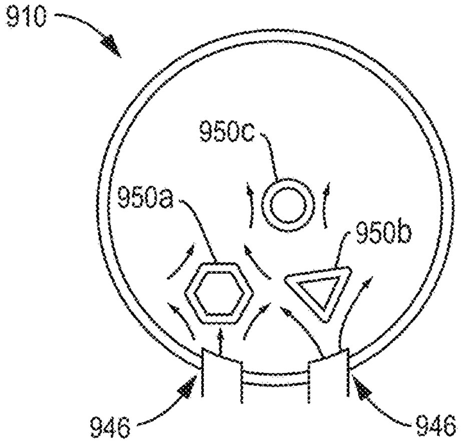
FIG. 9B is a top view of the reservoir of FIG. 9A.

Further examples of energy dissipation elements and energy dissipation element features are shown in FIGS. 9A-9D. As illustrated in FIG. 9A, a reservoir 910 can include a plurality of energy dissipation elements 950. The energy dissipation elements can be formed of precast segments 912 (FIG. 9D) and can, optionally, provide for the further function of supporting a roof 955 of the reservoir. While the energy dissipation elements 950, as illustrated in FIG. 9A, are of a height that is substantially similar to a height of the reservoir 910, the energy dissipation elements need not extend to a roof of the structure. In other words, the energy dissipation elements can be of any height. For example, energy dissipation elements having a height that is only about 10-50% of a total height of the reservoir can be sufficient for providing flow disruption. Structural wear on the reservoir resulting from high-velocity water being pumped into a high-elevation reservoir, or being permitted to flow into a low-elevation reservoir, can be greatest during periods where the reservoir is substantially empty or includes only a low water volume. Once an adequate amount of water has filled the reservoir, the impact of water flowing into the reservoir can be reduced.

It can also be advantageous to have energy dissipation elements extend a full height of the reservoir as connection or contact with a roof can provide for further structural support to the dissipation elements, even where the dissipation elements are not necessary for providing roof support.

The roof may also be formed of individual modules that span between two or more diffusers or a larger continuous module that covers the entirety of the reservoir module. The roof may also perform two functions: keep debris out of the reservoir module and serve as a stiffening support structure for each of the water velocity diffusers, whereby interconnection of the energy dissipation elements to each other by way of the roof helps the dissipation elements maintain lateral resistance strength against waterflow in the reservoir module.

As illustrated in FIG. 9A, the energy dissipation elements can include a perforated structure 953. Perforations included in the dissipation element structure can provide for further flow disruption while also reducing a weight of precast elements 912 used to construct the dissipation elements 950. The energy dissipation elements 950 can also be configured to interconnect with one or more precast segments forming foundation 918, as further described herein (see, e.g., FIG. 10).

The energy dissipation elements 950 can be of varying shapes. Example shapes are further shown in FIG. 9B, which illustrates a top view of reservoir 910. In particular, energy dissipation element 950*a* is of a polygonal cross-sectional shape, energy dissipation element 950*b* is of a triangular cross-sectional shape, and energy dissipation element 950*c* is of a circular cross-sectional shape. Other shapes are possible. A shape of an energy dissipation element can be adapted to provide for a desired water disruption pattern. Examples of water disruption patterns based on energy dissipation element shape an orientation with respect to ports 946 are shown with arrows in FIG. 9B.

Figure 9D:
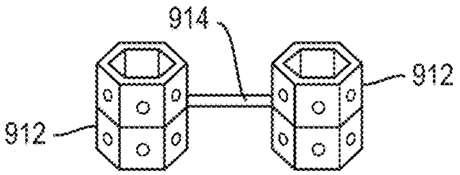
FIG. 9D is a perspective view of another example of a configuration of energy dissipation elements.

Energy dissipation elements can be oriented substantially vertically with respect to a foundation 918 of a reservoir. Optionally, energy dissipation elements 950 can be further supported by support elements 914 that are oriented substantially transversely with respect to elements 950, as shown in FIG. 9D. Such transversely-disposed support elements 914 can provide additional support to the dissipation elements.

Figure 9C:
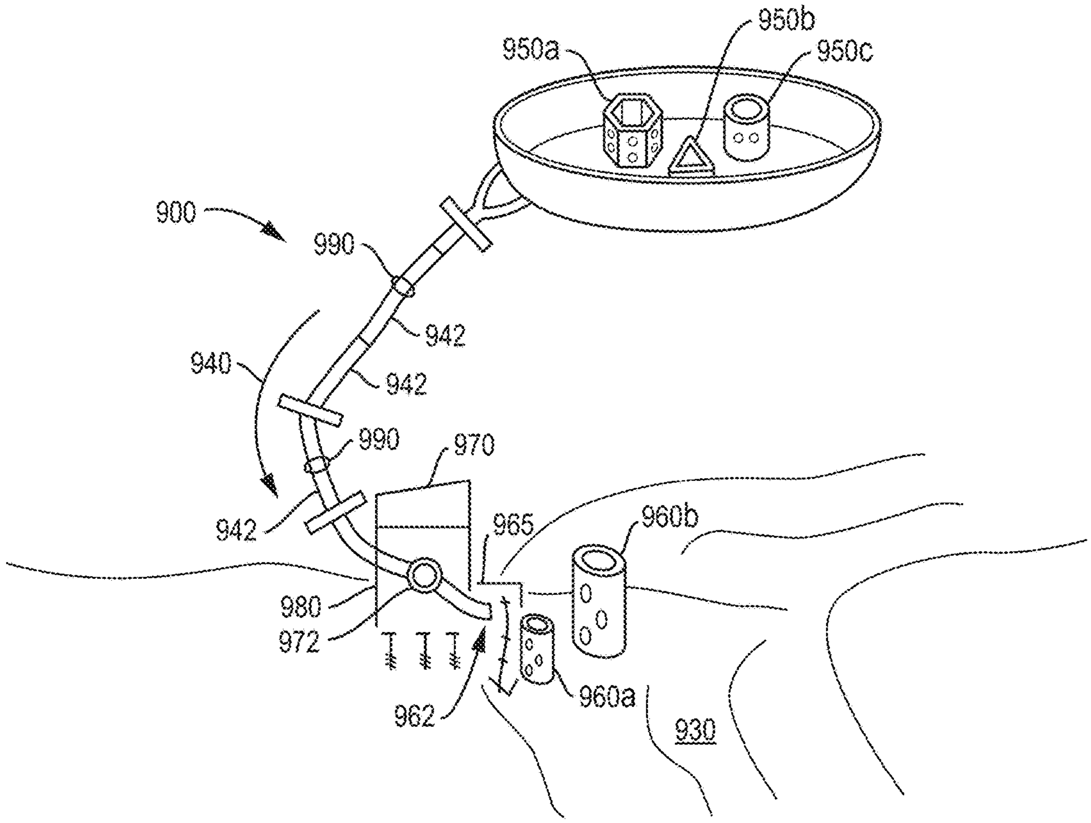
FIG. 9C is a high-level view of the reservoir of FIG. 9A in an open-look hydropower pumped storage system, with further energy dissipation elements provided in the natural water supply.

Energy dissipation elements can be included any reservoir of a pumped storage system, including an upper reservoir, a lower reservoir, and any intermediate reservoirs. Energy dissipation elements can also be provided at a natural (or man-made) water supply in an open-loop system, as shown in FIG. 9C. In particular, energy dissipation elements 960*a,b* are included near an outlet port 962 of a power conversion module 970 where water is returned to a water supply (e.g., a river, as illustrated).

Energy dissipation elements can alternatively be referred to as water flow pressure relief structures or water velocity diffuser structures. Such structures can be of any three-dimensional structure and can optionally include water passageways therethrough (e.g., perforated structures) to reduce and redirect water flow. Use of the diffusers is intended to redirect powerful waterflow from impacting any given wall or surface of the reservoir module to prevent or slow weakening or damaging of any given structure. This is particularly useful in the case of the precast segment reservoir module due to interlocking mechanisms between or among segments to maintain structural integrity of individual segments and the reservoir module as a whole. The water velocity diffusers may be arranged in any positions and numbers determined to be most suitable for diffusing the strength of water flow into or out of a respective reservoir module. It should also be understood that the diffusers may be positioned in the elevated reservoir module(s) or lower reservoir module(s).

As further illustrated in FIG. 9C, modular spillway diffusers 965 at a bottom of the hill are intended to absorb power of flowing water from the elevated location to prevent riverbed erosion. Likewise, as the water returning from the elevated location is combined with normal river flow water, the spillway diffusers can absorb energy and diffuse the energy such that the riverbed is unaffected or affected within a given tolerance by the rapidly flowing water.

The power conversion module 970 includes a turbine 972 in a flow path defined, in part, by a flow path segment 980, the turbine converting kinetic energy of water flowing through the flow path to electrical energy. In the course of flowing down, the flowing water causes the power generating turbine(s) 972 to rotate and generate electrical power that may be stored at an energy storage facility, where stored power can be released to a power grid (not shown) during peak power grid hours or otherwise used to power an electrical load.

As further illustrated with respect to FIG. 9C, the flow path 940 is further defined by precast conduit segments 942, which can optionally include or house pumps 990 anywhere along the flow path, at one or more locations. The pumps can be used to pump water up the flow path, from the water supply 930 to the reservoir 910.

Figure 10:
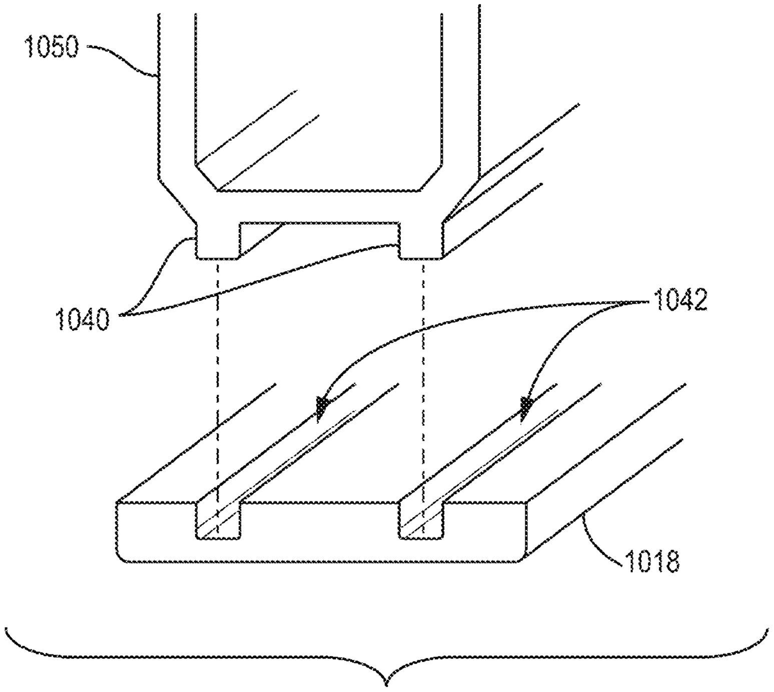
FIG. 10 is a schematic illustrating interconnection of an energy dissipation element precast segment with a reservoir foundation segment.

The energy dissipation elements can be configured to interconnect with one or more other precast segments defining a reservoir wall, reservoir foundation, and/or reservoir roof. An example interconnection arrangement is shown in FIG. 10. As illustrated, a precast segment of an energy dissipation element 1050 includes a coupling element 1040 that is configured to engage with a complementary coupling element 1042 of foundation precast segment 1018. As illustrated, the coupling elements 1040, 1042 provide for a keyway-type interconnection. Other interconnection configurations are possible.

Interconnection between diffusers and base segments of the reservoir module may be done in various manners, such as through complementary interconnection features (i.e., male and female interconnecting shapes, pins and sockets, or other interconnection techniques known in the art. Alternatively, base segments and diffusers may be integrated precast segment blocks that define both a base (i.e., lower flat surface) and a vertically or angularly oriented diffuser extending upward from the base. Alternatively, base segments of the reservoir module and a given diffuser may not be formally interconnected and instead rely on weight of the diffuser to maintain connection.

Energy dissipation elements defined by one or more precast segments can advantageously provide for straightforward and easy replacement when needed. For example, if an energy dissipation element begins to structurally fail, the element can be easily removed from the system by "unplugging" the element from the foundation; and, a new element can be easily "plugged-in" for replacement of the failing component. Other precast segments used to form other structures (e.g., fluid conduits, supports, etc.) can similarly benefit from such configurations with respect to maintenance and repair of the system.

Fluid conduits providing for a flow path of the system can be formed of precast segments. As shown in the example segments 1112 and 1122 of FIGS. 11A and 11B, such precast segments can include coupling elements 1140, 1142, 1144, and 1146. In particular, substantially tubular precast segments 1112 can include a recess 1142 at one end surface 1149 and a complementary protrusion 1140 at an opposing end surface 1148. Such tubular segments 1112 can then be interconnected in series to form a conduit for a flow path for a pumped storage system.

As shown in FIG. 11B, substantially semi-tubular elements 1122 can include one of a recess 1146 and a protrusion 1144 at a connecting surface 1147. As illustrated, conduit element 1122*a* includes protrusions 1144 at both of its connecting surfaces, while conduit element 1122*b* includes recesses 1146 at both of its connecting surface. Such a configuration can be useful so as to identify conduit elements that can be placed in a specific orientation (e.g., segments adapted to form an "upper" portion of a fluid conduit as opposed to a "lower" portion). Alternatively, each segment 1122 can include both types of linkages, with one of the connecting surfaces having a protrusion and the other a recess. While keyway-like structures are shown in FIGS. 11A and 11B, other linkage configurations are possible, such as dowel linkages.

An advantage of providing for precast fluid conduit segments is that a flow path can be installed at a hydropower site with minimum impact to the environment. For example, tunnels need not be bored through rock or ground, with such conduits being placed atop an earth surface. For a further example, as concrete need not be poured onsite, equipment use and transport at the site can be minimized. In particular, a crane can be set up (e.g., FIG. 7) in one or few set locations during construction, and precast segments for any component of the system can be placed in a desired location and controlled for interconnection with other precast segments.

Conduit supports can also be formed of precast segments, as shown in the example segment 1244 of FIG. 12. As illustrated, the segment 1244 can define a semi-cylindrical portion 1245 configured to receive a fluid conduit segment (e.g., segment 1112). The conduit support segment 1244 can include one or more coupling elements. For example, male dowel coupling elements 1244 and/or female dowel connections 1246 can be included for engaging with complementary coupling elements of a segment to be placed atop segment 1244. Coupling elements 1248 can also be included within the portion 1245 that receives a fluid conduit segment for engaging with a complementary coupling element of the fluid conduit segment.

Figure 15A:
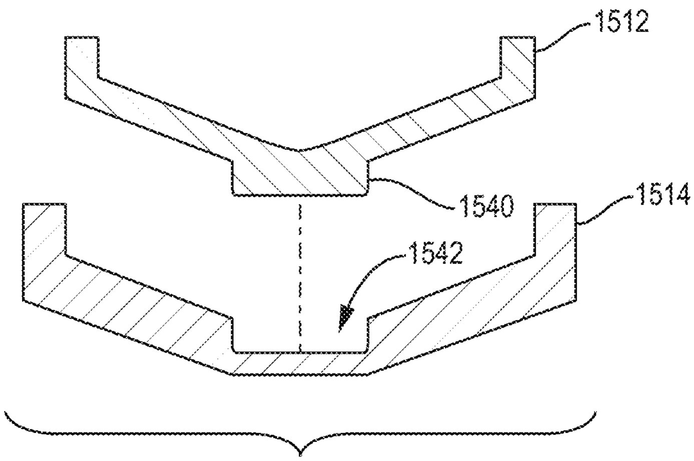
FIG. 15A illustrates a cross section view of two fluid conduit segments for interconnection.
Figure 15B:
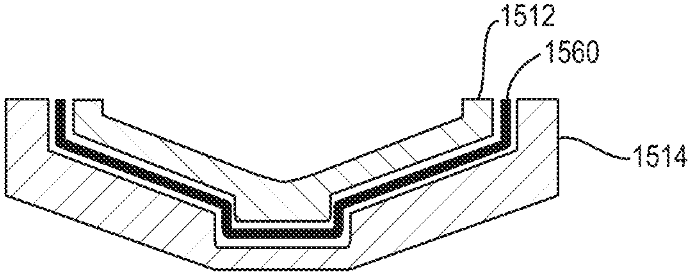
FIG. 15B illustrates a cross section view of an assembled state of the two fluid conduit segments of FIG. 15A.
Figure 15C:
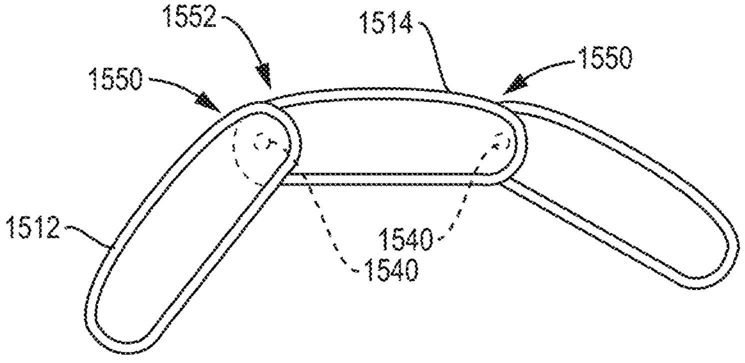
FIG. 15C illustrates a top view of interconnected fluid conduit segments.

Precast conduit segments can also include interconnection elements providing for linking ends of the segments in an adjustable manner. For example, as shown in FIGS. 15A-15C, a precast conduit segment 1512 can have at one end 1550 of its semi-tubular structure a linking element 1540, such as a projection, which is configured to engage with a complementary linking element 1542, such as a recess, an end 1552 of another precast conduit segment 1514. The precast conduit segments 1512, 1514 are shown in an assembled state in cross-section in FIG. 15B and from a top view in FIG. 15C. As illustrated an end 1550 of each precast segment can be tapered with respect to its opposing end, such that conduit segments can be linked narrower- to broader-ends. Alternatively, some precast segments can be wider than others, with wider and narrow precast segments being alternated to provide a linked fluid conduit structure providing for a flow path. An advantage of such linkages is that an angle of connection among precast conduit segments can be adjustable and can provide for flexibility and adaptability in installing the fluid conduits at a site.

Optionally, as further illustrated in FIG. 15B, a gasket 1560 can be disposed between the precast segments 1512, 1514 to provide for tolerance and water-tight sealing among segments. Gaskets, such as gasket 1560, or similar elastomer layers can be included between precast segments of any other structures. For example, gaskets, rubber sheets, elastomer seals, etc. can be disposed between each of precast segments 312, 314 to form a reservoir wall.

Figure 13:
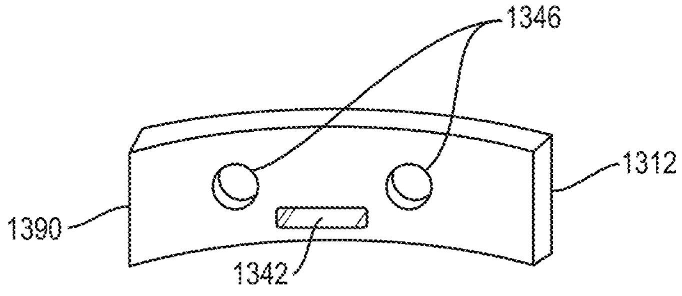
FIG. 13 is a schematic of a reservoir segment providing for various fluid ports.

Precast segments forming a portion of a wall of a reservoir can define inlet and outlet ports. For example, as shown in FIG. 13, a precast segment 1312 defines inlet ports 1346 and outlet port 1342 for a reservoir. The outlet port 1342 is disposed at a lower height than inlet ports 1346 so as to provide for more complete fluid evacuation from the reservoir during periods of energy generation. Furthermore, inlet ports 1346 disposed at a height above a floor 1390 of a reservoir can assist in reducing wear at the foundation of the reservoir during periods in which water is being pumped into the reservoir. Valves (e.g., valves 892) can be included at each port 1342, 1346.

Figure 14:
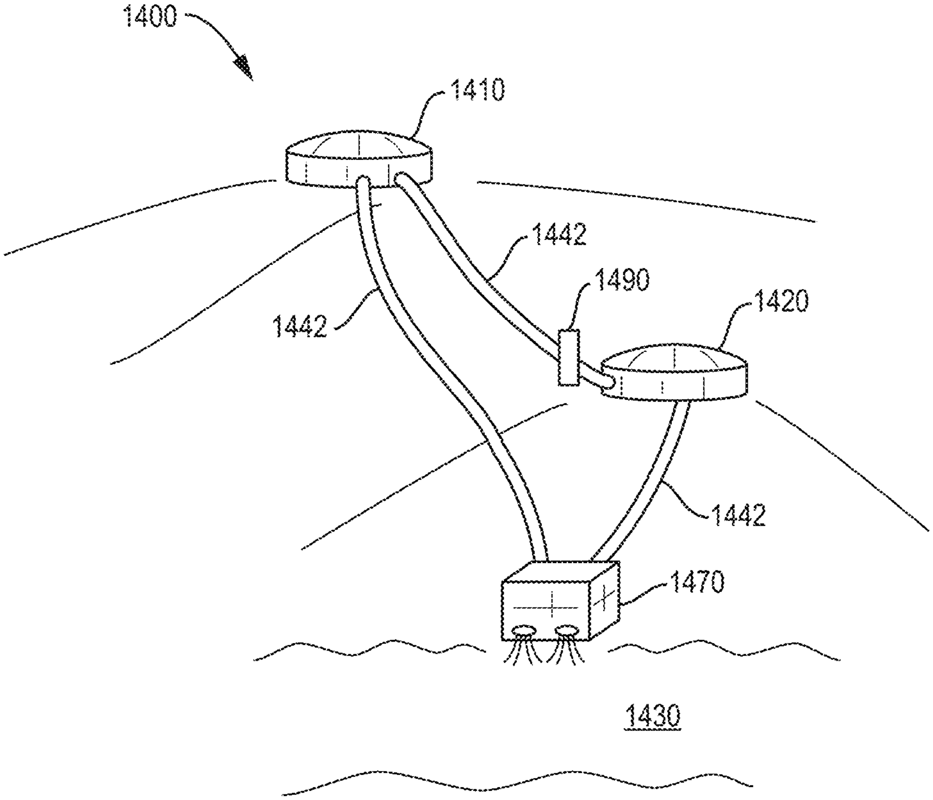
FIG. 14 is a high-level illustrating a pumped storage hydropower system with an intermediary reservoir.

A pumped storage system can include intermediary reservoirs disposed along a flow path of the system to provide for incremental flow in one or both of the up/down directions and alleviate burden on the system. As shown in FIG. 14, a system 1400 includes an upper reservoir 1410, an intermediary reservoir 1420, and water supply 1430 in fluidic communication with each other via fluid conduits 1442. A powerhouse 1470 can house an energy generation module and an energy conversion module, the energy conversion module providing for pumping of water from the water supply 1430 up to intermediary reservoir 1420. An intermediary pump 1490 can provide for pumping of water from the intermediary reservoir 1420 to the upper reservoir 1410.

Alternatively, a fluid conduit 1442 may fluidically couple the powerhouse 1470 to the upper reservoir 1410 directly. The fluid conduit 1442 may be piping or may be a tunnel bored by way of large machinery (not shown) into the land mass on which the upper reservoir 1410 resides. A tunnel may maintain its integrity through a series of precast segments (not shown) that are placed by a sophisticated tunnel boring machine or by other means. Such precast segments may have interlocking features to make the tunnel a continuous path through which water flows. Typical or customized water sealing techniques may be used such that leaks do not occur. The fluid conduits 1442 may each be above ground conduits or underground conduits and may be determined based on environmental factors as to whether above- or below-ground would provide highest integrity.

With further detail to a tunnel embodiment, an embodiment of the pump storage system may use tunnels (one or many) to act as or provide access for fluid flow conduits 1442 connecting the upper reservoir 1410 to the water supply 1430. Such tunnels in the past have been lined with cast-in-place concrete, utilizing either forms or spray systems. As envisioned herein, the use of modular precast segments (not shown) can be incorporated in embodiments described herein to support and line the fluid flow conduit(s) 1442 to provide strength and fluid leak prevention sealing. Each of the reinforced segments may be designed to interlock and form a fluid tight seal with adjacent segments to create the desired diameter and surface finish to enhance flow in either direction, that is, from lower to upper reservoir or vice-versa. Water stop systems (not shown) may be integrated into the precast modules to enable water stop (e.g., backflow prevention) functions. Pre-stress cabling (not shown) may be incorporated into the segments or later applied to pull adjacent precast segments together to strengthen the seal further and react directly to operational internal hydraulic pressure present during continuous and cycle changes in the pump storage system. Customized precast inflow and outflow precast segments may be integrated at the ends of the tunnel implementing the energy diffusion systems, described elsewhere herein.

It should be understood that flow management systems, such as valves, gates, and dividers may be incorporated into precast segments and also integrated into the pumped storage hydropower system at the water supply 1430, upper reservoir 1410, or any intermediary reservoir 1420. Rock bolts may also be incorporated to position and secure the fluid flow conduit(s) 1442 to surrounding bed rock.

Figure 16:
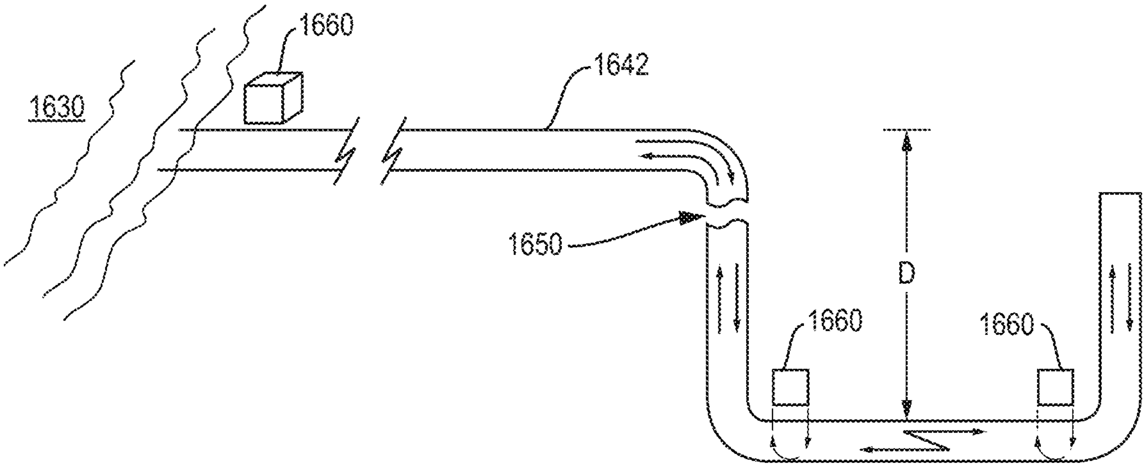
FIG. 16 is a schematic diagram of an alternative embodiment of the pumped storage hydropower system.

FIG. 16 is a diagram of a hydropower system that does not per se have reservoirs, but, instead, is formed by a fluid flow conduit 1642. The fluid flow conduit 1642 may be created by a boring machine (not shown) that creates a vertical drop of depth D to allow fluid from a fluid supply to drop vertically through a turbine associated with a power conversion module 1650. The fluid may be water pumped from a body of water, e.g., a lake or ocean 1630. Power generation modules 1660 pump water bidirectionally within the fluid conduit 1642, whereby the cost per kilowatt hour will determine whether water is pumped to or from the fluid supply. In the embodiment of FIG. 16, rather than pumping water upward to an upper reservoir, the water flows horizontally, possibly miles, from the fluid supply 1630 and downward into a portion of the fluid flow conduit 1642 that may be hundreds to thousands of feet below the surface of the earth. Power to generate the power generation modules may be provided by the power generation module 1650 or from auxiliary power sources (not shown), such as wind turbines, solar panels, wave pumps, and so forth.

The power generation systems provided can operate as follows. During periods of low-energy use, water (or other fluid) can be transferred from the fluid supply to the one or more higher-elevation reservoirs of the system. Thus, pumps can be drawing power from the electrical grid during periods in which burden on the grid is low. During periods of high-energy use, water (or other fluid) can be released from the one or more reservoirs. As the fluid is released, the energy conversion module(s) of the system can provide for conversion of kinetic energy of the flowing water to electrical energy and energy storage. Thus, during periods high-energy use, the PSH system can bolster power supply to the grid.

Alternatively, or in addition, pumping water to an upper reservoir of a pumped storage system can occur during periods in which another renewable energy collection system is available to power the pumps (e.g., such as mid-day, with respect to a solar farm providing power for pumping, or during periods of high wind, with respect to a wind farm), and release of the water can occur during periods in which the other renewable energy collection system is unavailable to produce power (e.g., such as at night or during periods of low wind).

The elevated reservoir module in any of the foregoing embodiments may be tilted away from an adjacent slope to withstand geologic instability, such as surface waves from an earthquake, so the reservoir module does not slide down an adjacent slope. Ground treatment below, surrounding, or beside an elevated or lower elevation reservoir module is contemplated within the scope of the implementation of the pump storage system embodiments disclosed herein.

Preliminary engineering calculations verify that a Minimum Threshold of 1 MW for 2 hours at full power output is feasible for an example ski resort evaluation. For example, assuming an elevation head of approximately 1,200 feet, as at a proposed proof-of-concept site, and a conservative round-trip efficiency of 60% (versus 70 to 80% for typical large-scale PSH), an upper reservoir can supply approximately 705,000 gallons of water. A reservoir comprising approximately seventy 8 ft-by-8 ft-by-8 ft modules can impound a reservoir large enough to retain a volume of 705,000 gallons of water. It is estimated that such a reservoir could be installed in approximately one week on a prepared foundation.

Preliminary engineering calculations verify that a Minimum Threshold of 1 MW for 2 hours at full power output is feasible for an example quarry evaluation. Assuming an elevation head of approximately 125 feet (typical for rock quarries) and a conservative round-trip efficiency of 60%, an upper reservoir can supply approximately 6.6 Million gallons of water. A reservoir comprising approximately 256 8 ft-by-8 ft-by-8 ft modules can impound a reservoir large enough to retain 6.6 Million gallons of water. It is estimated that such a reservoir can be installed in approximately four weeks on a prepared foundation.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A power generation system, comprising:

an impoundment structure at least partially defined by a plurality of precast segments, the impoundment structure being configured to store a volume of fluid, at least a subset of the precast segments interconnected via complementary coupling elements, the impoundment structure elevated with respect to a fluid supply;

a flow path providing fluid communication between the impoundment structure and the fluid supply;

a power generation module configured to pump fluid from the fluid supply and to produce a flow of the pumped fluid into the impoundment structure via the flow path;

at least one energy dissipation element disposed within the impoundment structure, the at least one energy dissipation element being configured to redirect the flow of the pumped fluid entering the impoundment structure; and a power conversion module configured to convert kinetic energy of fluid released from the impoundment structure and travelling through the flow path into electric energy, wherein the at least one energy dissipation element disposed within the impoundment structure is arranged in a shape that causes the flow of the pumped fluid redirected to be in a circulating direction within the impoundment structure.

2. The power generation system of claim 1, wherein the system is an open-loop system and the fluid supply is a natural water supply.

3. The power generation system of claim 1, wherein the system is a closed-loop system and further comprises a lower impoundment structure housing the fluid supply.

4. The power generation system of claim 1, wherein the at least one dissipation element is further configured to disrupt a direction of fluid flow, to reduce a velocity of flowing fluid, or a combination thereof of fluid pumped from the fluid supply into the impoundment structure.

5. The power generation system of claim 1, wherein each of the energy dissipation elements is at least partially defined by at least one auxiliary precast segment.

6. The power generation system of claim 5, wherein the at least one auxiliary precast segment of each energy dissipation element comprises a coupling element configured to couple the energy dissipation element mechanically to a complementary coupling element of a precast segment of the impoundment structure.

7. The power generation system of claim 1, wherein a given energy dissipation element, in a coupled state with a respective precast segment of the impoundment structure, is disposed substantially vertically with respect to a base of the impoundment structure.

8. The power generation system of claim 7, wherein the given energy dissipation element is further configured to support a roof of the impoundment structure structurally above the base or the roof of the impoundment structure is configured to couple to the given energy dissipation element.

9. The power generation system of claim 1, wherein at least a subset of the energy dissipation elements comprises perforated structures.

10. The power generation system of claim 1, further comprising energy dissipation elements disposed at a lower impoundment structure housing the fluid supply or a natural water supply providing for the fluid supply, the energy dissipation elements configured to disrupt a direction of fluid flow, to reduce a velocity of flowing fluid, or a combination thereof of fluid released from the impoundment structure and arriving at the lower impoundment structure or natural water supply.

11. The power generation system of claim 1, wherein the impoundment structure comprises a continuous base and the plurality of precast segments comprises precast segments configured to couple to an upper surface of the base.

12. The power generation system of claim 1, wherein the plurality of precast segments comprises precast segments having at least two opposing surfaces of a substantially triangular or truncated triangular shape, the precast segments alternately arranged to define a wall of the impoundment structure.

13. The power generation system of claim 1, wherein the flow path is defined by at least two fluid conduits, the fluid conduits individually selectable for fluid transfer between the fluid supply and the impoundment structure.

14. The power generation system of claim 13, wherein the power generation module comprises at least one dedicated pump at each of the at least two fluid conduits.

15. The power generation system of claim 1, wherein the power generation module comprises at least two fluid pumps disposed at varying elevations at a fluid conduit at least partially defining the flow path.

16. The power generation system of claim 15, wherein the water conduit includes or is in fluid communication with an intermediary impoundment structure disposed upstream of one of the at least two fluid pumps.

17. The power generation system of claim 1, wherein the power generation module and power conversion module are integrated into a single module that includes a turbine configured to rotate in a first direction to pump the fluid from the fluid supply and into the impoundment structure via the flow path and to rotate in a second direction to convert the kinetic energy of fluid released from the impoundment structure into electric energy.

18. The power generation system of claim 1, wherein the impoundment structure is at least partially enclosed by a roof.

19. The power generation system of claim 1, wherein the plurality of precast segments comprises at least one precast foundation segment.

20. The power generation system of claim 1, wherein the plurality of precast segments comprises impoundment segments configured to encase infill to at least partially define the impoundment structure.

21. The power generation system of claim 1, wherein the flow path is defined by at least two fluid conduits and wherein the impoundment structure comprises an outlet port for fluid released from the impoundment structure and an inlet port for fluid pumped into the impoundment structure, the inlet port disposed at a higher elevation than the outlet port.

22. The power generation system of claim 1, wherein the flow path is defined by at least one fluid conduit, the fluid conduit defined by a plurality of precast conduit segments.

23. The power generation system of claim 1, further comprising material flowed and coupled to a precast segment, the material positioned over a seam between adjacent precast segments or defining an energy dissipation element.

24. The power generating system of claim 1, further comprising a three-dimensional (3D) material printing system coupled to a precast segment on a base of or at an upper surface of the impoundment structure, the 3D material printing system accessing material from a source of material located at the impoundment structure and transferring the material to a different precast segment via a boom.

25. The power generating system of claim 1, wherein the flow path defines a port into the impoundment structure that, in combination with the flow path, directs the flow of the pumped fluid at least partially in a transverse direction to a base; and wherein the at least one energy dissipation element disposed within the impoundment structure is arranged to cause the flow of the pumped fluid to be redirected in a transverse direction within the impoundment structure different from the transverse direction in which the flow entered the impoundment structure.

26. A power generation method comprising:

with the power generation system of claim 1:

- transferring fluid from the fluid supply to the impoundment structure via the flow path;
- releasing fluid from the impoundment structure to the fluid supply via the flow path; and
- storing energy converted by the power conversion module during fluid release.

27. The power generation method of claim 26, wherein the transferring of fluid from the fluid supply to the impoundment structure occurs during a period of low-energy use.

28. The power generation method of claim 26, wherein the releasing of fluid from the impoundment structure to the fluid supply occurs during a period of high-energy use.

29. A power generation system, comprising:

an impoundment structure at least partially defined by a plurality of precast segments and at least partially defined by a base, the impoundment structure being configured to store a volume of fluid, at least a subset of the precast segments interconnected via complementary coupling elements, the impoundment structure elevated with respect to a fluid supply;

a flow path providing fluid communication between the impoundment structure and the fluid supply;

a power generation module configured to pump fluid from the fluid supply and to produce a flow of the pumped fluid into the impoundment structure via the flow path;

at least one energy dissipation element disposed within the impoundment structure at a position laterally offset from a perimeter of the base, the at least one energy dissipation element being configured to redirect the flow of the pumped fluid entering the impoundment structure; and a power conversion module configured to convert kinetic energy of fluid released from the impoundment structure and travelling through the flow path into electric energy, wherein at least a subset of the energy dissipation elements comprises perforated structures.

30. A power generation method comprising:

with the power generation system of claim 29:

- transferring fluid from the fluid supply to the impoundment structure via the flow path;
- releasing fluid from the impoundment structure to the fluid supply via the flow path; and
- storing energy converted by the power conversion module during fluid release.

31. The power generation method of claim 30, wherein the transferring of fluid from the fluid supply to the impoundment structure occurs during a period of low-energy use.

32. The power generation method of claim 30, wherein the releasing of fluid from the impoundment structure to the fluid supply occurs during a period of high-energy use.

33. A power generation system, comprising:

an impoundment structure at least partially defined by a plurality of precast segments and at least partially defined by a base, the impoundment structure being configured to store a volume of fluid, at least a subset of the precast segments interconnected via complementary coupling elements, the impoundment structure elevated with respect to a fluid supply;

a flow path providing fluid communication between the impoundment structure and the fluid supply;

a power generation module configured to pump fluid from the fluid supply and to produce a flow of the pumped fluid into the impoundment structure via the flow path;

at least one energy dissipation element disposed within the impoundment structure at a position laterally offset from a perimeter of the base, the at least one energy dissipation element being configured to redirect the flow of the pumped fluid entering the impoundment structure; and a power conversion module configured to convert kinetic energy of fluid released from the impoundment structure and travelling through the flow path into electric energy, wherein the flow path defines a port into the impoundment structure that, in combination with the flow path, directs the flow of the pumped fluid at least partially in a transverse direction to the base; and wherein the at least one energy dissipation element disposed within the impoundment structure is arranged to cause the flow of the pumped fluid to be redirected in a transverse direction within the impoundment structure different from the transverse direction in which the flow entered the impoundment structure, wherein the at least one energy dissipation element disposed within the impoundment structure is arranged in a shape that causes the flow of the pumped fluid redirected to be in a circulating direction within the impoundment structure.

34. A power generation method comprising:

with the power generation system of claim 33:

transferring fluid from the fluid supply to the impoundment structure via the flow path;

releasing fluid from the impoundment structure to the fluid supply via the flow path; and storing energy converted by the power conversion module during fluid release.

35. The power generation method of claim 34, wherein the transferring of fluid from the fluid supply to the impoundment structure occurs during a period of low-energy use.

36. The power generation method of claim 34, wherein the releasing of fluid from the impoundment structure to the fluid supply occurs during a period of high-energy use.

* * * * *